(12) United States Patent
Kilmer et al.

(10) Patent No.: US 7,363,287 B2
(45) Date of Patent: Apr. 22, 2008

(54) OLAP QUERY GENERATION ENGINE

(75) Inventors: Lee Eric Kilmer, Stillwater, MN (US); Richard Scott Bendickson, Maple Grove, MN (US); Thomas Joseph Pavelka, Savage, MN (US); Gary Lynn Jaquier, Apple Valley, MN (US)

(73) Assignee: Lawson Software, Inc., St. Paul, MN (US)

( * ) Notice: Subject to any disclaimer, the term of this patent is extended or adjusted under 35 U.S.C. 154(b) by 523 days.

(21) Appl. No.: 10/645,708

(22) Filed: Aug. 20, 2003

(65) Prior Publication Data

US 2004/0039736 A1    Feb. 26, 2004

Related U.S. Application Data

(62) Division of application No. 09/797,303, filed on Mar. 1, 2001, now Pat. No. 6,651,055.

(51) Int. Cl.
*G06F 17/30* (2006.01)
(52) U.S. Cl. .................................. 707/2; 707/3; 707/4
(58) Field of Classification Search .............. 707/1–10, 707/100–104.1, 200–206
See application file for complete search history.

(56) References Cited

U.S. PATENT DOCUMENTS

| | | | |
|---|---|---|---|
| 5,940,818 A | 8/1999 | Malloy et al. ................. 707/2 |
| 6,094,651 A | 7/2000 | Agrawal et al. ................ 707/5 |
| 6,115,714 A | 9/2000 | Gallagher et al. ........... 707/100 |
| 6,122,636 A * | 9/2000 | Malloy et al. ............... 707/102 |
| 6,154,766 A | 11/2000 | Yost et al. ................... 709/201 |
| 6,279,033 B1 | 8/2001 | Selvarajan et al. ......... 709/217 |
| 6,408,292 B1 | 6/2002 | Bakalash et al. .............. 707/2 |
| 6,567,796 B1 | 5/2003 | Yost et al. ..................... 707/2 |
| 6,609,123 B1 * | 8/2003 | Cazemier et al. .............. 707/4 |

OTHER PUBLICATIONS

"e-ScoreCard. Analyzing Data at the Speed of Thought", *Lawson Software*, E-DS111-1000, 5M-NA, Minneapolis, MN,(2000),4 pages.
"Hyperion Essbase OLAP Server", *Hyperion Solutions Corporation*, Sunnyvale, CA,(2000),8 pages.
"Hyperion Essbase SQL Interface", *Hyperion Solutions Corporation*, Sunnyvale, CA,(1998),2 pages.
"Opening the Door to Unlimited e-Business", *Lawson Software*, E-B651-1000, 12M-NA, Minneapolis, MN,(2000),15 pages.
"Proving Value with Workforce Analytics", *Lawson Software*, E-DS104-0600, 5M-NA, Minneapolis, MN,(2000),4 pages.
"U.S. Appl. No. 09/797,303 Notice of allowance mailed Jun. 03, 2003", 10 pgs.

* cited by examiner

*Primary Examiner*—Yicun Wu
(74) *Attorney, Agent, or Firm*—Schwegman, Lundberg & Woessner, P.A.

(57) ABSTRACT

A system and method for generating an On-Line Analytical Processing (OLAP) query. A query object is provided that supports a plurality of OLAP servers which use different structured query formats. An OLAP server is determined from among the OLAP servers for which the query will be executed based on a property of the query object. The query object is processed to generate a query statement using the structured query format that corresponds to the determined OLAP server.

13 Claims, 27 Drawing Sheets

Sample MDX Query Statement

Select NON EMPTY {[Customers].[All Customers]} On Columns, NON EMPTY {[Education Level].[All Education Level].[All Education Level].[Bachelors Degree], [Education Level].[All Education Level].[Graduate Degree], [Education Level].[All Education Level].[High School Degree], [Education Level].[All Education Level].[Partial College], [Education Level].[All Education Level].[Partial High School]} On Rows From [Sales]

Sample Report Script Query Statement

{TABDELIMIT} {DECIMAL 10} <QUOTEMBRNAMES {OUTMBRNAMES} {MISSINGTEXT "0"} <ROW("Periods") <COLUMN("Chart of Accounts") <DUPLICATE "Chart of Accounts" <DUPLICATE "p Begin Bal" <DUPLICATE "p Qtr1" <DUPLICATE "p Qtr2" <DUPLICATE "p Qtr3" <DUPLICATE "p Qtr4" <DUPLICATE "p Qtr1YTD" <DUPLICATE "p Qtr2YTD" <DUPLICATE "p Qtr3YTD" <DUPLICATE "p Qtr4YTD" <DUPLICATE "Periods" !

| FUNCTION | DESCRIPTION |
|---|---|
| DRILL | DRILL UP OR DOWN ON A MEMBER |
| PIVOT | MOVE A DIMENSION FROM ONE AXIS TO ANOTHER |
| KEEP ONLY | KEEP ONLY THE SELECTED MEMBER(S) FOR THE DIMENSION |
| REMOVE ONLY | REMOVE ONLY THE SELECTED MEMBER(S) FOR THE DIMENSION |

2000 

| FUNCTION | PROCESS |
|---|---|
| DRILL | SET THE *RELATIONSHIP* (CHILDREN, PARENT, ETC.) PROPERTY ON THE SELECTED MEMBER TO A DRILL OPTION, AND THEN RE-CREATE THE QUERY STATEMENT. FOR SPECIAL DRILL OPTIONS (LIKE DRILL TO ANCESTORS, OR DESCENDANTS), AN EXPRESSION OBJECT MAY BE MORE USEFUL AS IT ALLOWS THE INCLUSION OF ADDITIONAL ARGUMENTS TO SUPPORT THE DRILLING OPERATION. |
| PIVOT | REMOVE THE SELECTED DIMENSION FROM ITS CURRENT AXIS AND ADD IT TO THE TARGET AXIS. NOTE, THE USER MAY ALSO OPTIONALLY SPECIFY AN ORDINAL AT WHICH TO ADD THE DIMENSION. THIS DRIVES THE ORDER OF ALL DIMENSIONS ON THE AXIS. NOTE, THE "FROM" AND "TO" AXIS MAY BE THE SAME IF THE USER IS SIMPLY RE-ORDERING THE DIMENSIONS ON THE AXIS. RE-CREATE THE QUERY STATEMENT. |
| KEEP ONLY | REMOVE ALL MEMBERS EXCEPT THE SELECTED MEMBER(S) FROM THE AFFECTED DIMENSION. THEN, RE-CREATE THE QUERY STATEMENT. |
| REMOVE ONLY | REMOVE ONLY THE MEMBER(S) SPECIFIED FROM THE AFFECTED DIMENSION. THEN RE-CREATE THE QUERY STATEMENT. |

| AXIS COLLECTION | DIMENSION | MEMBER |
|---|---|---|
| ROWS | ACCOUNTS | REVENUE |
| | | EXPENSES |
| | | NET INCOME |
| | TIME | QUARTER 1 |
| | | QUARTER 2 |
| | | QUARTER 3 |
| | | QUARTER 4 |
| COLUMNS | FISCAL YEARS | 1999 |
| | | 2000 |

2200

|  |  | 1999 | 2000 |
|---|---|---|---|
| REVENUE | QUARTER 1 | 1000.00 | 1400.00 |
|  | QUARTER 2 | 1100.00 | 1500.00 |
|  | QUARTER 3 | 1200.00 | 1600.00 |
|  | QUARTER 4 | 1300.00 | 1700.00 |
| EXPENSES | QUARTER 1 | 1000.00 | 1200.00 |
|  | QUARTER 2 | 1050.00 | 1250.00 |
|  | QUARTER 3 | 1100.00 | 1300.00 |
|  | QUARTER 4 | 1150.00 | 1350.00 |
| NET INCOME | QUARTER 1 | 0.00 | 200.00 |
|  | QUARTER 2 | 50.00 | 250.00 |
|  | QUARTER 3 | 100.00 | 300.00 |
|  | QUARTER 4 | 150.00 | 350.00 |

2300

| AXIS COLLECTION | DIMENSION | MEMBER |
|---|---|---|
| ROWS | TIME | QUARTER 1 |
| | | QUARTER 2 |
| | | QUARTER 3 |
| | | QUARTER 4 |
| | ACCOUNTS | REVENUE |
| | | EXPENSES |
| | | NET INCOME |
| COLUMNS | FISCAL YEARS | 1999 |
| | | 2000 |

2400

| | | 1999 | 2000 |
|---|---|---|---|
| QUARTER 1 | REVENUE | 1000.00 | 1400.00 |
| | EXPENSES | 1000.00 | 1200.00 |
| | NET INCOME | 0.00 | 200.00 |
| QUARTER 2 | REVENUE | 1100.00 | 1500.00 |
| | EXPENSES | 1050.00 | 1250.00 |
| | NET INCOME | 50.00 | 250.00 |
| QUARTER 3 | REVENUE | 1200.00 | 1600.00 |
| | EXPENSES | 1100.00 | 1300.00 |
| | NET INCOME | 100.00 | 300.00 |
| QUARTER 4 | REVENUE | 1300.00 | 1700.00 |
| | EXPENSES | 1150.00 | 1350.00 |
| | NET INCOME | 150.00 | 350.00 |

2500

| AXIS COLLECTION | DIMENSION | MEMBER |
|---|---|---|
| ROWS | TIME | QUARTER 1 |
| | | QUARTER 2 |
| | | QUARTER 3 |
| | | QUARTER 4 |
| COLUMNS | FISCAL YEARS | 1999 |
| | | 2000 |
| | ACCOUNTS | REVENUE |
| | | EXPENSES |
| | | NET INCOME |

2600

|  |  | 1999 |  |  | 2000 |  |
|---|---|---|---|---|---|---|
|  | REVENUE | EXPENSES | NET INCOME | REVENUE | EXPENSES | NET INCOME |
| QUARTER 1 | 1000.00 | 1000.00 | 0.00 | 1400.00 | 1200.00 | 200.00 |
| QUARTER 2 | 1100.00 | 1050.00 | 50.00 | 1500.00 | 1250.00 | 250.00 |
| QUARTER 3 | 1200.00 | 1100.00 | 100.00 | 1600.00 | 1300.00 | 300.00 |
| QUARTER 4 | 1300.00 | 1150.00 | 150.00 | 1700.00 | 1350.00 | 350.00 |

2700

|  |  | 1999 |  |  | 2000 |  |
|---|---|---|---|---|---|---|
|  | REVENUE | EXPENSES | NET INCOME | REVENUE | EXPENSES | NET INCOME |
| QUARTER 1 | 1000.00 | 1000.00 | 0.00 | 1400.00 | 1200.00 | 200.00 |
| QUARTER 2 | 1100.00 | 1050.00 | 50.00 | 1500.00 | 1250.00 | 250.00 |
| QUARTER 3 | 1200.00 | 1100.00 | 100.00 | 1600.00 | 1300.00 | 300.00 |
| QUARTER 4 | 1300.00 | 1150.00 | 150.00 | 1700.00 | 1350.00 | 350.00 |

OLAP QUERY GENERATION ENGINE

RELATED APPLICATIONS

This application is a divisional of U.S. patent application Ser. No. 09/797,303, filed Mar. 1, 2001, now U.S. Pat. No. 6,651,055, which application is incorporated herein by reference.

FIELD OF THE INVENTION

The present invention relates to the field of multi-dimensional databases. In particular, this invention relates to an On-Line Analytical Processing (OLAP) query generation engine for generating OLAP queries for use with different OLAP servers.

BACKGROUND OF THE INVENTION

On-Line Analytical Processing (OLAP) database servers provide a platform for high-end analytics and decision support applications. OLAP technology allows organizations (i.e., enterprises) to extract data from multiple, disparate transactional and operational systems into homogenous, aggregated repositories of information for the purpose of high-performance analysis and reporting. The process of moving data out of core transactional and operational systems into an OLAP environment typically includes cleansing the data by enforcing consistency and data integrity, and aggregating the data using like keys. This process is known as data transformation. The result of the data transformation process is a multi-dimensional OLAP database, known as an "OLAP cube", which is highly optimized for reporting and analysis.

OLAP cubes are typically subject-matter oriented, with the data in the cube being organized by a series of dimensions. The dimensions are hierarchical in nature (e.g., year, quarter, month, etc.) to allow for multiple levels of data aggregation. An end user can thus choose whether to analyze data in an OLAP cube at varying levels of data aggregation, such as at summary, intermediate and detailed analysis levels. OLAP data cubes with different subject matters typically have different numbers of dimensions with different hierarchical designs. OLAP cubes can also share one or more dimensions to provide a homogenous view of the structure of the cube data amongst different cubes. The concept of keying cube data by dimensions, known as dimensional modeling, allows for a simplified approach to reporting and analysis of data. In particular, users need only understand the dimensions of the OLAP cubes and their hierarchies, and are insulated from the need to understand the underlying physical implementation of the database schema that is used to store the data. Thus, users are presented with a logical view of the information stored in the cube, and can create reports and queries without having to perform complex joins or any other function which would require an understanding of the underlying database structure.

The leading OLAP database servers on the market today are the Hyperion Essbase™ OLAP server, available from Hyperion Solutions Corp. of CA, and the Microsoft Analysis Services OLAP server, available from Microsoft Corp. of WA. Both servers provide the ability to build subject matter cubes using dimensional modeling techniques which support hierarchies, calculated members, aggregations, and high-performance reporting and analysis. From a querying standpoint, both servers offer similar features, but with very different implementations. In particular, the structured query formats used for the two database servers are very different. The query language used for the Microsoft Analysis Services OLAP server is known as Multi-Dimensional Expression Query Language ("MDX"). The MDX query language leverages Microsoft's OLE database ("OLEDB") for OLAP standard, and follows a Structured Query Language (SQL)-like syntax with special extensions that are used for OLAP cube querying. The special extensions are needed since SQL is only two-dimensional, while OLAP data cubes are n-dimensional. The query language that is used for the Hyperion Essbase™ OLAP server is known as Report Scripts ("RS"). Although the RS query language provides a full range of querying options within the Hyperion Essbase™ environment, the syntax of queries for RS is very different from the syntax of queries for MDX. For example, exemplary MDX and RS query statements 100 are shown in FIG. 1 (note the data cubes used for the two examples contained different data). A comparison shows that the syntax used to create these query statements is very different. The differences between these formats makes it difficult for OLAP query and reporting applications to support both Microsoft Analysis Services and Hyperion Essbase™ OLAP servers from the same code base.

Along with the Microsoft Analysis Services and Hyperion Essbase™ OLAP database servers, there are other OLAP servers on the market today that use other structured query formats. Further, there are likely to be still other OLAP servers on the market in the future that will use still other structured query formats, including formats that are not yet known. The differences in structured query formats between these present and future OLAP servers makes it even more difficult for OLAP query and reporting applications to support any or all of these different servers. For example, it would be very difficult to design an OLAP query and reporting application that can be easily adapted to support a future OLAP server that will use a structured query format that is as yet unknown.

In the relational database world, the SQL and Open Database Connectivity ("ODBC") standards are industry-standard methodologies for accessing relational databases. Thus, query and reporting applications in the relational database world can implement SQL and ODBC methodologies to access relational databases across relational database vendors. Unfortunately, industry-standard methodologies do not exist for use with OLAP database technology. In particular, there are currently no SQL or ODBC-type standards that simplify the generation of OLAP queries. Thus, it is difficult for an OLAP query and reporting application to support both Microsoft Analysis Services and Hyperion Essbase™ servers from one code base, or to support other combinations of OLAP servers that use, or will use, different structured query formats.

Thus, there is a need for a method and apparatus for generating OLAP queries which can be used by OLAP query and reporting applications to efficiently and easily support multiple OLAP database servers that use different structured query formats. For example, there is a need for a method and apparatus for generating OLAP queries which can be used by OLAP query and reporting applications to support both Microsoft Analysis Services and Hyperion Essbase™ database servers from one code base. There is also a need for a method and apparatus for generating OLAP queries which can be used by OLAP query and reporting applications to support other OLAP servers on the market today that use different structured query formats, or that can be easily adapted to support OLAP servers that will be on the market in the future.

SUMMARY OF THE INVENTION

In accordance with one embodiment of the present invention, a method of generating an On-Line Analytical Processing (OLAP) query includes providing a query object capable of supporting a plurality of OLAP servers (each server using a different structured query format), determining an OLAP server from among the plurality of OLAP servers for which the query will be executed based upon a property of the query object, and processing the query object to generate a query statement using the structured query format which corresponds to the OLAP server that was determined.

In one embodiment of this method, the query statement is generated using the Multi-Dimensional Expression (MDX) query format when the property of the query object indicates the OLAP server is a Microsoft Analysis Services OLAP server. In this embodiment, processing the query object may include generating a select clause and a from clause from the query object, and combining the select and the from clauses to generate the query statement. Processing the query object may also include generating a with clause, a where clause and/or an order by clause, and combining any of these other clauses with the select clause and the from clause.

In another embodiment of this method, the query statement is generated using the Report Scripts (RS) query format when the property of the query object indicates the server is an Hyperion Essbase™ OLAP server. In this embodiment, processing the query object may include generating a header specification, an axis specification and an execute specification from the query object, and combining the header, axis and execute specifications. The processing may also include generating a member specification and/or an expression specification, and combining either or both of these other specifications with the header, axis and execute specifications.

In another embodiment of this method, the query object can support at least three OLAP servers, and each of these OLAP servers uses a different structured query format.

In accordance with another embodiment of the present invention, an apparatus for generating an OLAP query using a query object capable of supporting a plurality of OLAP servers (each server using a different structured query format) includes means for determining an OLAP server from among the plurality of OLAP servers based upon a property of the query object, and means for processing the query object to generate a query statement using the structured query format which corresponds to the OLAP server that was determined.

In one embodiment of this apparatus, the query object can support the Microsoft Analysis Services OLAP server and the Hyperion Essbase™ OLAP server, and the means for processing generates an MDX query statement and an RS query statement when the property indicates that the OLAP server is a Microsoft Analysis Services OLAP server and an Hyperion Essbase™ OLAP server, respectively. In another embodiment of this apparatus, the query object is capable of supporting at least three OLAP servers which each uses a different structured query format, and the means for processing generates the query statement using one of the at least three formats.

In accordance with another embodiment of the present invention, an OLAP query generation engine includes a query object model with a data structure which models an OLAP query, and a programming interface for generating an OLAP query statement from the query object model according to a structured query format specified by the query object model. The data structure may model the OLAP query in an abstract form that is compatible with multiple OLAP structured query formats, or in a form abstract from implementation of the underlying OLAP servers. The programming interface may also maintain or execute the query statement. In one embodiment of the engine, the query object model can specify the MDX and RS query formats, and the programming interface generates an MDX query statement and an RS query statement when the query object model specifies the MDX query format and the RS query format, respectively. In another embodiment, the query object model can specify first, second and third structured query formats, and the programming interface generates the query statement using the first, second and third formats when the query object model specifies the first, second and third structured query formats, respectively.

In accordance with another embodiment of the present invention, an OLAP query object model includes a query object that defines an OLAP query in abstract form, and a root object including methods for transforming the query object into an OLAP query statement according to a structured query format specified by the query object. In one embodiment of this model, the query object can specify the MDX query format and the RS query format, and the root object includes methods for generating an MDX query statement and an RS query statement when the query object specifies the MDX query format and the RS query format, respectively. In another embodiment of this model, the query object is capable of specifying first, second and third structured query formats, and the root object includes methods for generating the query statement using the first, second and third structured query formats when the query object specifies the first, second and third structured query formats, respectively.

In accordance with another embodiment of the present invention, an OLAP query generation engine is for use with an OLAP query and reporting application that supports first and second OLAP servers using first and second structured query formats. The engine includes an object model having a data structure that models an OLAP query, and a programming interface for generating an OLAP query statement according to the first structured query format when the first structured query format is specified by the object model and according to the second structured query format when the second structured query format is specified. In one embodiment of this engine, the application supports a Microsoft Analysis Services OLAP server using the MDX query format and an Hyperion Essbase™ OLAP server using the RS query format, and the programming interface generates an MDX query statement and an RS query statement when the object model specifies the MDX query format and RS query format, respectively. In another embodiment of this engine, the query and reporting application supports first, second and third OLAP servers using first, second and third structured query formats, and the programming interface generates the query statement using the first, second and third structured query formats when the first, second and third structured query formats are specified.

These and various other features as well as advantages which characterize the present invention will be apparent to a person of ordinary skill in the art upon reading the following detailed description and reviewing the associated drawings. Such a person of ordinary skill in the art may have knowledge, for example, of MDX, RS and OLAP or multi-dimensional database technology.

BRIEF DESCRIPTION OF THE DRAWINGS

FIG. 1 is a diagram comparing an exemplary Multi-dimensional Expression (MDX) query statement (top) with an exemplary Report Script (RS) query statement (bottom), which indicates that syntax for the MDX and RS query statements differs;

FIG. 20 is a chart describing how to process the functions listed in FIG. 19;

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and that structural changes may be made without departing from the scope of the invention.

This application describes a method and an apparatus for generating OLAP queries that can be used to allow OLAP query and reporting applications to easily and efficiently support multiple OLAP servers that use different structured query formats. The method and apparatus are implemented by what may be referred to as an OLAP query generation engine that interfaces with OLAP query and reporting applications. In one embodiment, the OLAP query generation engine allows OLAP query and reporting applications to support both Microsoft Analysis Services and Hyperion Essbase™ database servers from the same code base. The OLAP query generation engine can also be extended to support other OLAP servers, including those on the market today as well as future OLAP servers that will be on the market in the future.

Figure 2:
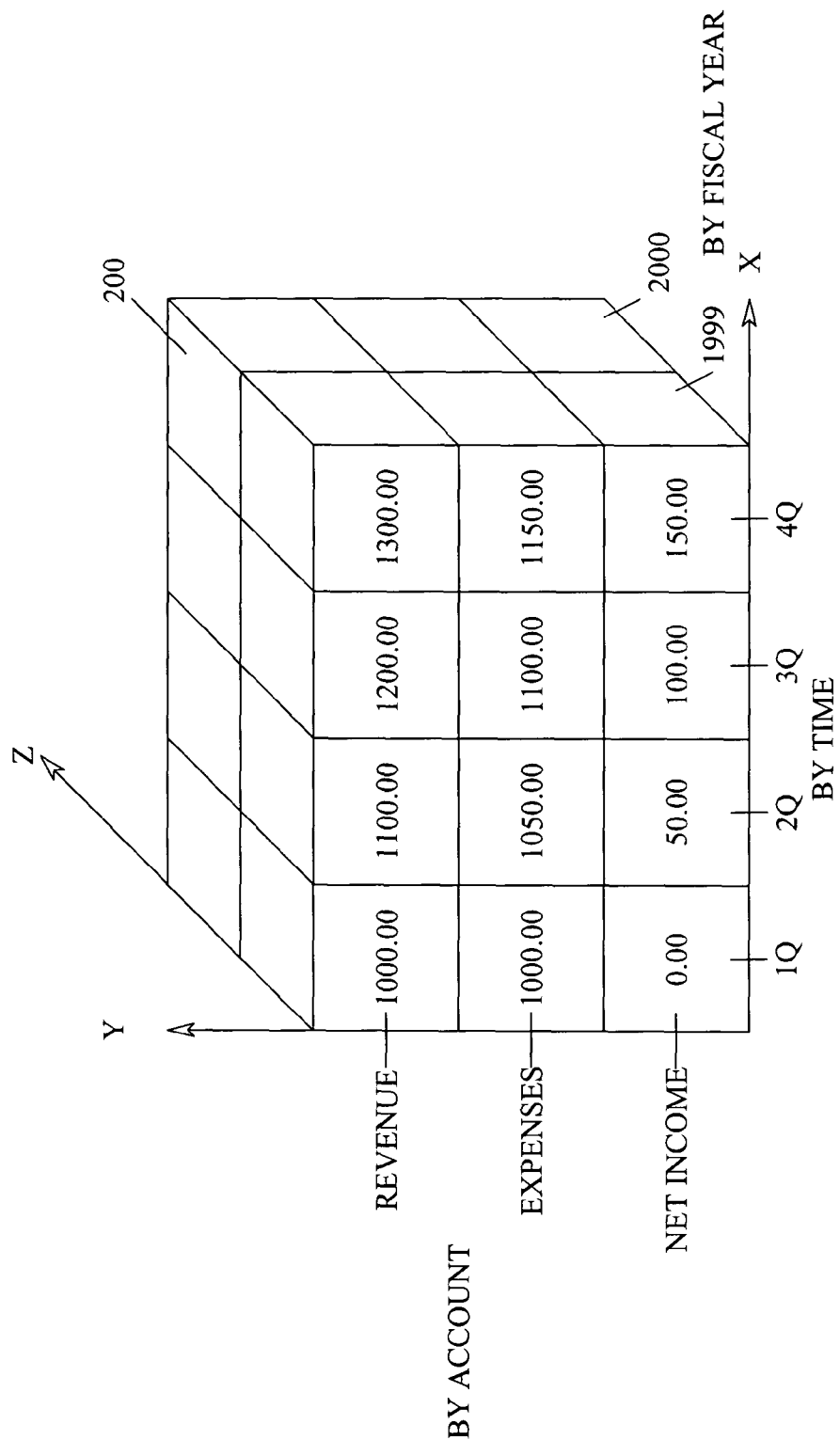
FIG. 2 is a diagram showing the logical structure of an exemplary On-Line Analytical Processing (OLAP) multi-dimensional database (i.e., an OLAP cube)

The logical structure of an exemplary OLAP cube is represented by FIG. 2. In this example, cube 200 represents a financial analysis cube with three dimensions (i.e., time, account, fiscal year). Each of the dimensions includes multiple members, with the time dimension having four members (i.e., 1Q, 2Q, 3Q, 4Q), the accounts dimension having three members (i.e., revenue, expenses, net income), and the fiscal year dimension having two members (i.e., 1999, 2000). Cube 200 allows end users to query data by the unique combination of the members of each dimension.

Thus, end users have the ability to report on the financial amount data by time, by account and by fiscal year. For example, an end user could query OLAP cube 200 to find and report that the expenses in the third quarter of fiscal year 1999 were $1100.00. Further, since one or more of the dimensions is hierarchical in nature, an end user has the ability to drill up and to drill down to analyze different levels of summary, intermediate and detailed information. For example, an end user may be able to drill up on the time dimension to find financial amount data by half years, or may be able to drill down on the time dimension to find such data by month, week or day. The OLAP cube shown in FIG. 2 can be referred to as a three-dimensional cube having the time, account and fiscal year dimensions on the x, y and z-axes, respectively. In general, an OLAP data cube may be referred to as an n-dimensional cube having n dimensions. For example, a five-dimensional financial analysis OLAP cube would have five dimensions, such as organization, accounts, fiscal years, periods and scenarios (i.e., scenarios=actuals, budgets, forecast, etc.) dimensions. An OLAP cube may thus have n-dimensions, each dimension having any number of members.

With an OLAP cube, analysis is performed on cube data by the individual combinations of members in each dimension. Some OLAP database servers further provide the ability to augment the cube data by allowing users to create calculated, or derived, members. Calculated members are typically calculated by applying a function to other members within the OLAP cube. For example, a cube may have a scenarios dimension with actuals and budgets members that are populated through a data transformation process from a financial system. However, calculated amounts such as variance or variance percent may not be available from the financial system. In this situation, since users may wish to analyze variance or variance percent data, some OLAP servers give the user the ability to augment the cube data by generating calculated, or derived, data for variance and variance percent. The user can then query the OLAP data cube to analyze this calculated data. This capability to create calculated members allows OLAP cube designers to offer rich, high-performance, and aggregated data sets for the purposes of key performance indicator analysis, trend analysis, variance analysis, benchmark analysis, and a variety of other uses.

In one embodiment, the OLAP query generation engine described herein is implemented as a software module contained within the e-Analytic Server available from Lawson Software of St. Paul, Minn., which is the assignee of the present application. This module defines a standard object model and abstraction layer for OLAP query and reporting applications. The abstraction layer is useful for the support of OLAP query and reporting applications that can access both Microsoft Analysis Services and Hyperion Essbase™ database servers from the same code base. The object model supports the general concepts of OLAP queries for either server, while allowing for more advanced features from each server to be used as part of an OLAP query. The object model design can be implemented by OLAP query and reporting applications to allow the applications to support both Microsoft Analysis Services and Hyperion Essbase™ servers easily and effectively from the same code base. Thus, the designs of the abstraction layer and object model are open enough to handle the general concepts of OLAP queries while being detailed enough to allow for the implementation and leveraging of specific features of the respective OLAP servers. The OLAP query generation engine described herein can also be integrated with other current OLAP servers, or with future OLAP technologies. While the OLAP query generation engine described herein has been used with the Lawson Software e-Analytics Server, it should be understood that the methods and apparatus that are described herein can also be used in other OLAP environments.

Figure 3:
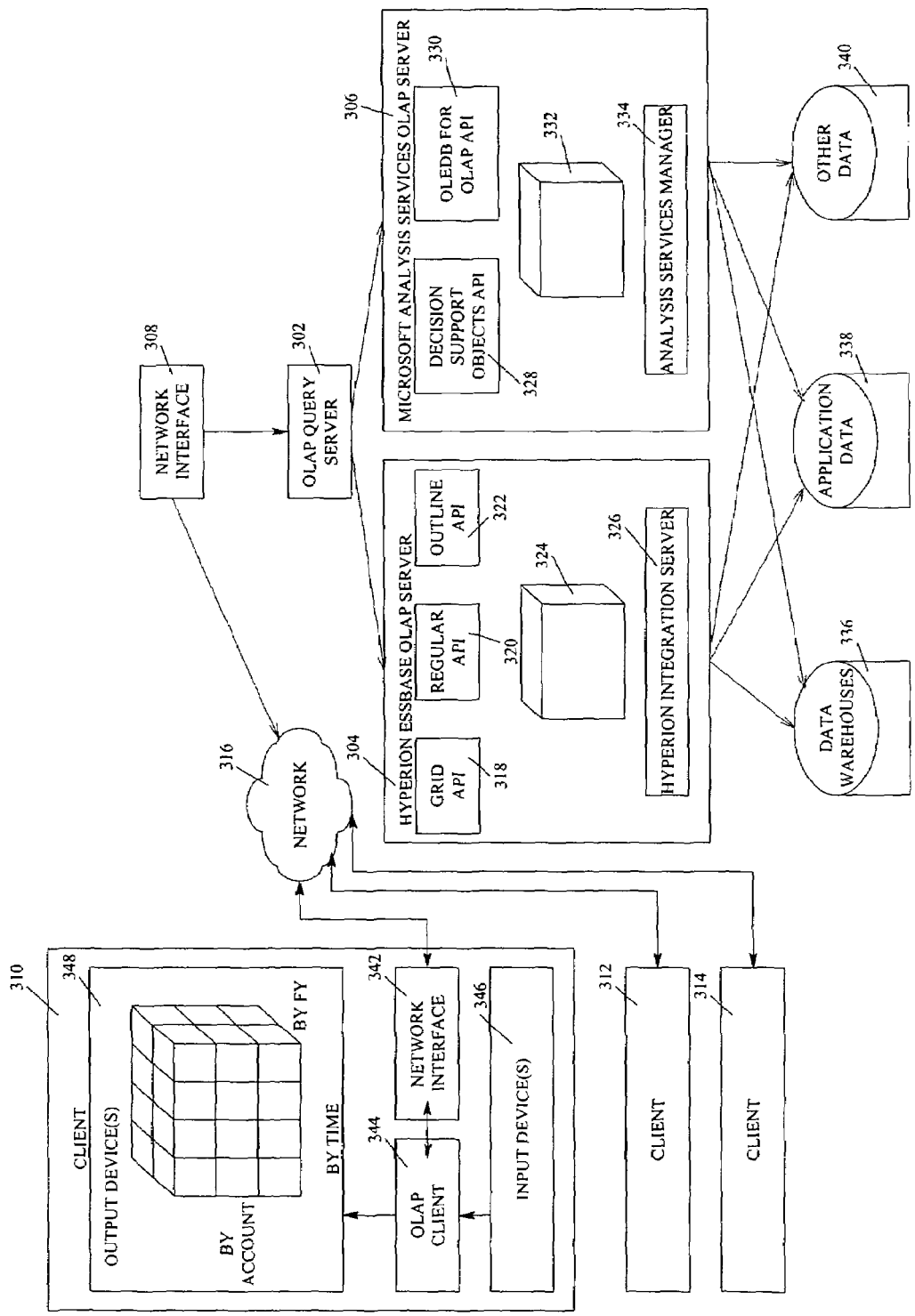
FIG. 3 is a block diagram of an exemplary hardware environment which uses an OLAP query generation engine in accordance with the present invention.

Referring to FIG. 3, an exemplary hardware environment 300 which uses an OLAP query generation engine in accordance with the present invention is shown. Environment 300 includes an OLAP query server 302 and, coupled to OLAP query server 302, an Hyperion Essbase™ OLAP server 304, a Microsoft Analysis Services OLAP server 306, and a network interface 308. Via network interface 308, OLAP query server 302 is capable of bi-directional communications with a plurality of clients 310, 312 and 314 (e.g., client computers or devices) via a network 316 (e.g., a LAN, a WAN, the Internet, etc.). Although OLAP query server 302 is shown to be in communication with three clients 310, 312 and 314 in FIG. 3, it should be understood that server 302 may communicate with more or fewer than three clients. It should also be understood that environment 300 could include one or more other OLAP servers besides the two OLAP servers 304 and 306 that are shown in FIG. 3.

The components of Hyperion Essbase™ OLAP server 304 include a grid application programming interface (API) 318, a regular API 320, an outline API 322, an Hyperion Essbase™ OLAP data cube 324, and a Hyperion integration server 326. The components of Microsoft Analysis Services OLAP server 306 include a decision support objects API 328, an OLEDB for OLAP API 330, a Microsoft Analysis Services OLAP data cube 332, and an Analysis Services Manager 334. Cubes 324 and 332 are subject-matter oriented cubes which were created through a data transformation process by moving data out of any number of transactional and/or operational systems. For example, cubes 324 and 332 may each have been created from data warehouse 336, application data 338, and/or other data 340. As described below, OLAP query server 302 can access data within cubes 324 and 332.

Each client 310, 312 and 314 includes a network interface 342, an OLAP client 344, one or more input device(s) 346, and one or more output device(s) 348 (note that these components are shown for only one client 310 in FIG. 3). Network interface 342, coupled to network 316, carries out communications with server 302 via network 316. OLAP client 344 is coupled to network interface 342 to allow for bidirectional communications with server 302 via network 316. Input device(s) 346, which may include a keyboard, mouse, pointer, voice-recognition circuit or other input device, allow an end user to provide commands and data to OLAP client 344. Output device(s) 348, which may include a display, printer, speaker or other output device, provide representations of outputs to the end user. The output device 348 shown in FIG. 3, for example, is a display which provides a multi-dimensional view of the results of an analysis performed on one of OLAP data cubes 324 or 332.

By using clients 310, 312 and 314, end users can remotely run OLAP query and reporting applications that reside on server 302, and can monitor the results of such applications, from remote locations. For example, an end user can use input device(s) 346 to run a particular query and reporting application on OLAP server 302 that performs an analysis of financial data in one of cubes 324 or 332, and can see a multi-dimensional view of the results of this analysis on output device(s) 348. The query and reporting applications may include, for example, the lawson.insight™ Self-Evident Applications® (SEAs), available from Lawson Software, the assignee of the present application. End users can advantageously run these SEAs remotely from clients 310, 312 and 314, with the SEAs themselves residing in OLAP server 302. By using these SEAs, the end users can perform key performance indicator analysis, trend analysis, benchmark analysis, or a variety of other analysis, including analysis supporting high-end analytics and decision support applications.

It should be understood that FIG. 3 illustrates just one exemplary hardware environment which uses an OLAP query generation engine in accordance with the present invention. This engine can also be used in other hardware environments. For instance, OLAP query server 302 and OLAP servers 304 and 306 may reside as virtual servers on a mainframe computer, or coexist on a single server or computer.

The OLAP query generation engine described herein allows query and reporting applications residing on OLAP query server 302 to support both Microsoft Analysis Services and Hyperion Essbase™ database servers. Before discussing the engine in detail, it is first noted that a typical OLAP query follows an organization with select, from, where and order by clauses. The select clause defines dimension and member sets, while the from clause defines the OLAP cube which will be the target for the query. The where and order by clauses, which are optional, are used to describe filtering and sorting criteria for the query, respectively. An OLAP query object includes Row and Column axes, each of which contains at least one dimension (and may contain more than one dimension). An OLAP query object may also include an (optional) Page axis, which may itself contain zero or more dimensions. Microsoft Analysis Services can support queries with more than these three axes, while Hyperion Essbase™ does not support more than these three axes. Thus, OLAP queries are n-dimensional, and are shaped into two-axis record sets.

When developing an OLAP query generation engine that is abstract from the implementation of the underlying OLAP servers, one challenge is to create objects and programs that effectively support similarities in concept between OLAP servers, but also handle the differences between OLAP servers. The OLAP query generation engine described herein accomplishes this balance by providing objects that handle each clause of an OLAP query (i.e., the select,from, where and order by clauses).

Figure 4:
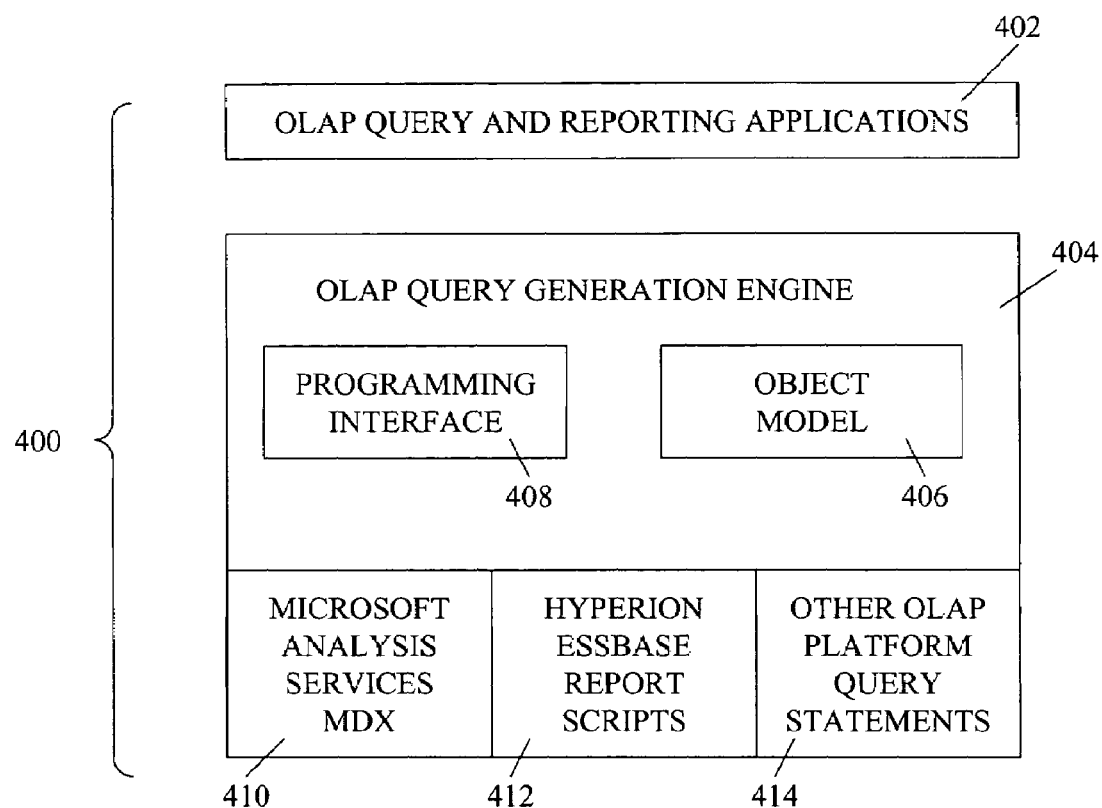
FIG. 4 is a diagram illustrating the relationship between OLAP query and reporting applications and an OLAP query generation engine that provides a common way to generate MDX, RS and/or other forms of OLAP query statements.

Referring to FIG. 4, a diagram 400 shows the relationship between OLAP query and reporting applications 402 and an OLAP query generation engine 404 in accordance with one embodiment of the present invention. In this embodiment, OLAP query generation engine 404 allows query and reporting applications 402 to support both Microsoft Analysis Services and Hyperion Essbase™ database servers. OLAP query generation engine 404 can also be easily extended to allow query and reporting applications 402 to support other OLAP servers on the market today, or even future OLAP servers. For example, engine 404 can support Relational OLAP (ROLAP), Multidimensional OLAP (MOLAP) or Hybrid OLAP (HOLAP) systems.

OLAP query generation engine 404 defines a standard object model and an abstraction layer for OLAP query and reporting applications 402, and generates OLAP queries using the MDX, RS or another structured query format. In particular, query generation engine 404 includes a query object model 406 and a programming interface 408 which are configured to maintain, generate and execute OLAP queries. Query object model 406 effectively implements a data structure which models an OLAP query in abstract form. The root object in the object model contains methods allowing for the transformation of the object model's contents into an OLAP query statement in the specified format (i.e., using the MDX, RS or other structured query format). Programming interface 408 generates an OLAP query statement from query object model 406 in accordance with the specified format, in a manner as described below. The query statements that are generated by engine 404 may comprise MDX query statements 410, RS query statements 412, and/or query statements 414 according to another OLAP structured query format. Therefore, the software architecture shown in FIG. 4 provides a common way to query OLAP data cubes such as data cubes 324 and 332 (FIG. 3) from query and reporting applications 402, and also allows for the addition of other OLAP servers that need to be supported but have different query methods.

OLAP Query Object Model

Figure 5:
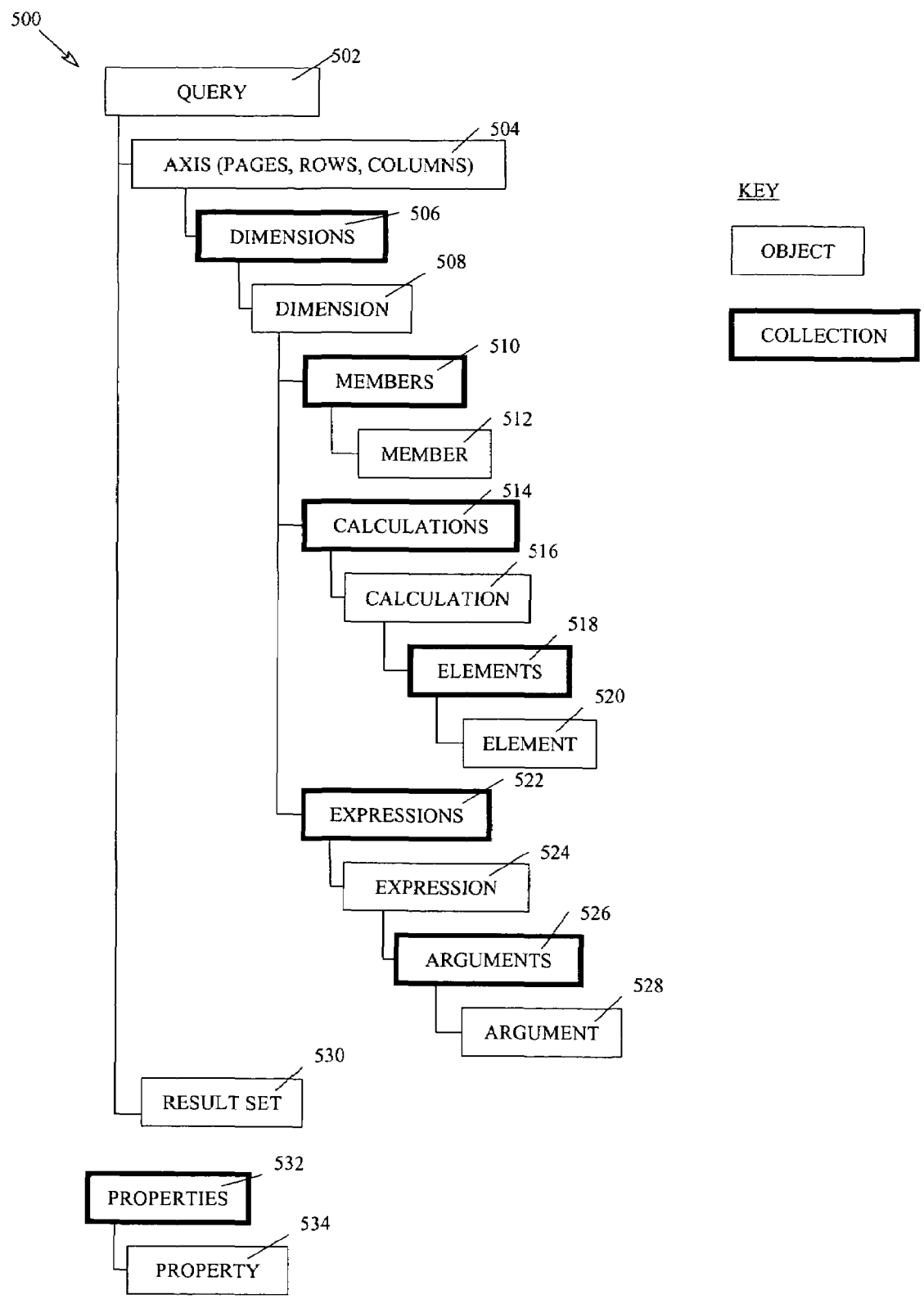
FIG. 5 is a diagram illustrating an OLAP query object model which implements a data structure that models an OLAP query in an abstract form, and which includes a root object containing methods for transforming the object model's contents into an OLAP query statement using the MDX, RS or other query syntax.

Referring to FIG. 5, in one embodiment, a diagram 500 shows the software structure of OLAP query object model 406, which includes objects and collections. In particular, in this embodiment (working from top to bottom), OLAP query object model 406 includes a Query object 502, an Axis (pages, rows, columns) object 504, a Dimensions collection 506, a Dimension object 508, a Members collection 510, a Member object 512, a Calculations collection 514, a Calculation object 516, an Elements collection 518, an Element object 520, an Expressions collection 522, an Expression object 524, an Arguments collection 526, an Argument object 528, a Result Set object 530, a Properties collection 532, and a Property object 534.

The objects in OLAP query object model 406 (i.e., objects 502, 504, 508, 512, 516, 520, 524, 528, 530, 534) are associated with properties and methods. The properties and methods allow maintenance of the query definition. For example, the properties and methods allow adding or removing of Dimensions from the OLAP query's axes, or selection of specific Members from a particular dimension. The Query object 502 also has a Source property that, when requested programmatically, returns the MDX, RS or other OLAP structured query format source (i.e., query statement) for the entire query object model 406. When the query is executed against an OLAP server, Result Set object 530 is populated with the cells, rows and columns, and the data, of the query. Properties collection 532 and Property object 534 are attached to Query object 502, Dimension object 508, Member object 512 and Element object 520. Property objects allow query and reporting applications to implement custom or special processing of information, for use in formatting, hiding data, or other uses.

The properties and methods of the objects in OLAP query object model 406 that support the creation and maintenance of OLAP database queries are shown in the Appendices below. In particular, Appendix A shows the properties and methods of Query object 502, Appendix B shows the properties and methods of Dimension object 508, Appendix C shows the properties of Member object 512, Appendix D shows the properties of Calculation object 516, Appendix E shows the properties and methods of Element object 520, Appendix F shows the properties and methods of Expression object 524, Appendix G shows the properties of Argument object 528, and Appendix H shows the properties of Property object 534.

Processing OLAP Query Object Model to Create an OLAP Query

OLAP query object model 406 is processed to create an appropriate query statement using the MDX, RS or other OLAP structured query format. The Provider property of query object 502 specifies whether the query statement that is generated follows the MDX, RS or other OLAP query syntax. For example, in one embodiment, a value of 1 specifies that an RS query statement will be generated, and a value of 2 specifies that an MDX query statement will be generated. Other values (e.g., 3) may be used to specify generation of other OLAP query statements. Other values may also be used. The Provider property will cause the processing of the objects in the Query object model to occur in a certain order that will depend on the structured query format that is specified by the Provider property. The resulting query statement becomes the Source property of query object 502.

Figure 6:
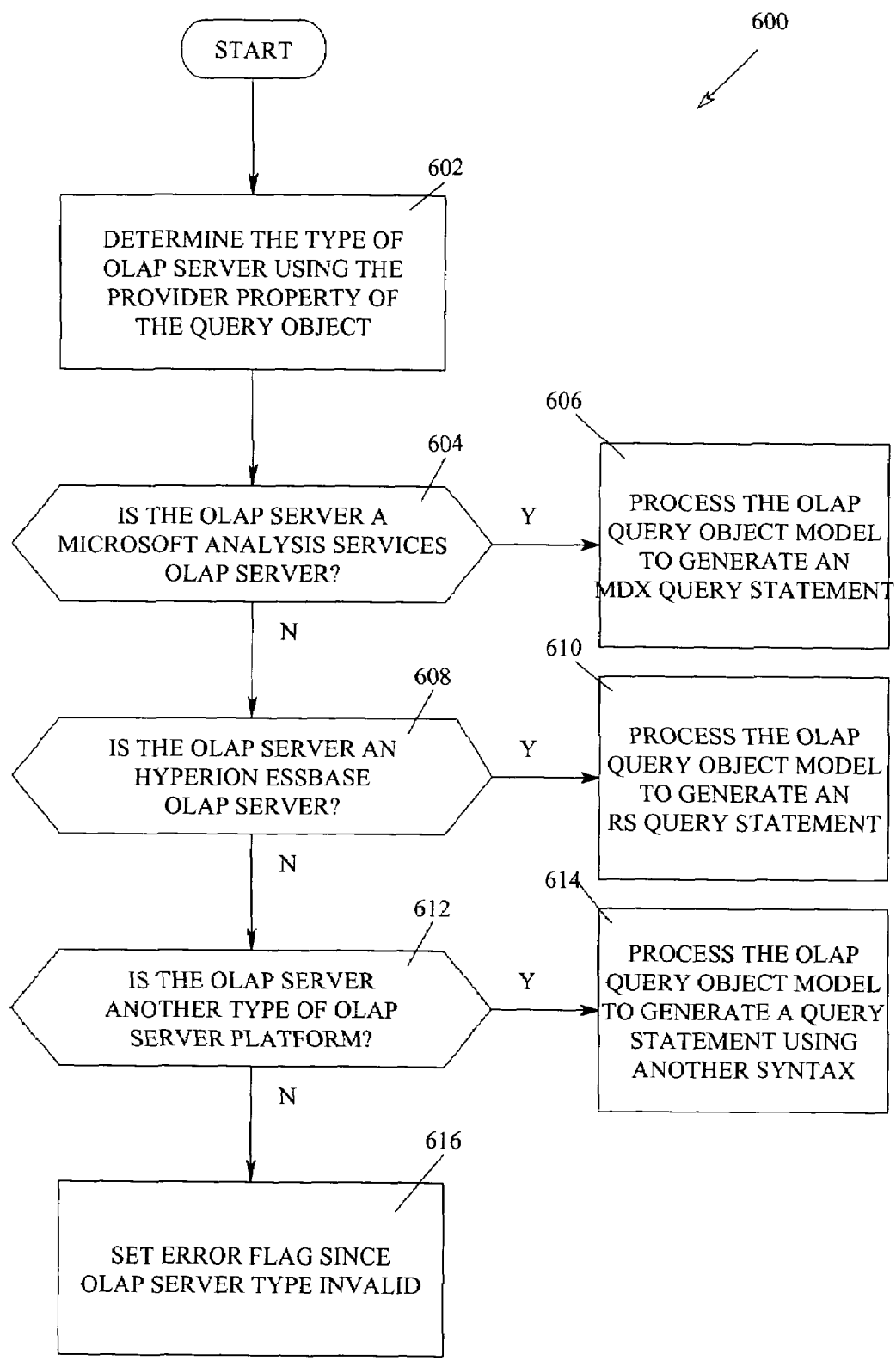
FIG. 6 is an overview flow chart of a method for processing the OLAP query object model of FIG. 5 to create an OLAP query statement using a specified syntax.

An overview of this processing is shown in FIG. 6. In particular, the type of OLAP server the Query will be executed against is determined from the Provider property of query object 502 (at 602). If the OLAP server for which the query will be executed is a Microsoft Analysis Services OLAP server (at 604), then OLAP query object model 406 is processed to generate an MDX query statement (at 606). If, on the other hand, the OLAP server for which the query will be executed is an Hyperion Essbase™ OLAP server (at 608), then OLAP query object model 406 is processed to generate an RS query statement (at 610). If another type of OLAP server is supported and the query will be executed against this other OLAP server (at 612), then OLAP query object model 406 is processed to generate an OLAP query statement using the structured query format for this other OLAP server (at 614). Otherwise, if the type of OLAP server that the Query will be executed against cannot be determined from the Provider property, then an error flag is set (at 616). Thus, the format of the query statement will depend on the Provider property.

For the purposes of this application, a Microsoft Analysis Services OLAP server is intended to include any OLAP server that supports the MDX query syntax, even if the actual vendor that supplies the server is not Microsoft Corp. Similarly, an Hyperion Essbase™ OLAP server is intended to include any OLAP server that supports the RS query syntax, even if the actual vendor is not Hyperion Solutions.

Processing OLAP Query Object Model to Create an MDX Query

Figure 7:
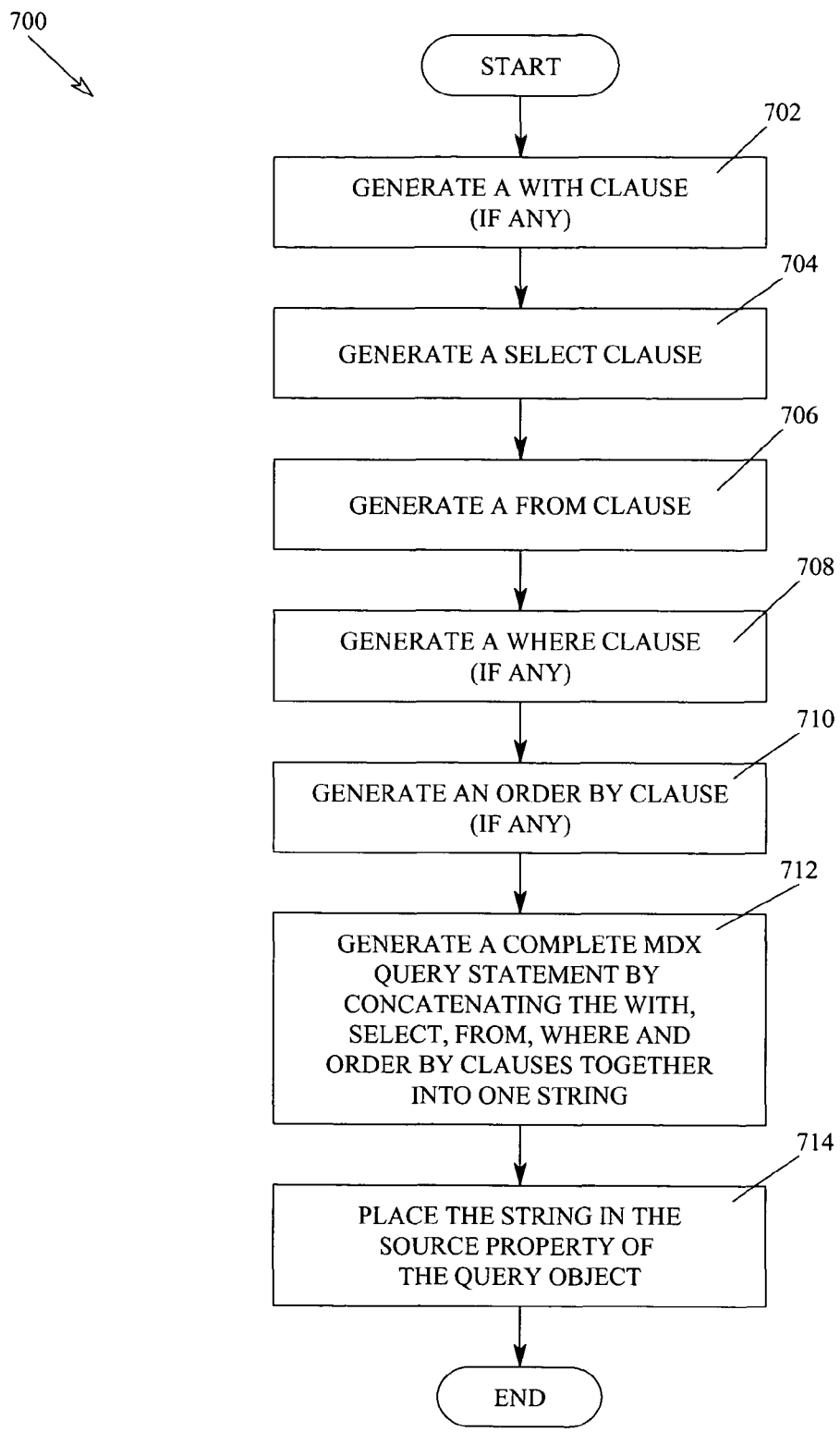
FIG. 7 is a flow chart of a method for processing the OLAP query object model of FIG. 5 to create an OLAP query statement using the MDX syntax.

Referring to FIG. 7, a method 700 is used for processing OLAP query object model 406 to create an OLAP query statement using the MDX syntax (i.e., at 606). Generating the MDX query statement starts by generating the individual clauses of the MDX statement. In particular, at 702, if the query requires server-based MDX calculations, the calculation formula and definition are created as the first part of the query by generating an optional With clause. The calculated members may then be selected later in the Select clause of the query. At 704 and 706, the Select and the From clauses are generated. Then, at 708 and 710, optional Where and Order By clauses are generated (if any). Each of 702, 704, 706, 708 and 710 is described in further detail below. After generating the individual clauses of the MDX statement, the complete MDX query statement is generated (at 712) from these individual clauses. In particular, the complete MDX query statement is generated by concatenating the With (if any), Select, From, Where (if any), and Order By (if any) clauses together into one string. At 714, this string is then placed in the Source property of OLAP query object 502. When completed, the MDX query statement will have the following structure:

With . . . <calculation definition>
Select <members>on Columns, <members> on Rows
From <cube>
Where <member filter, or slicer>
Order By <member, member set>

Figure 8:
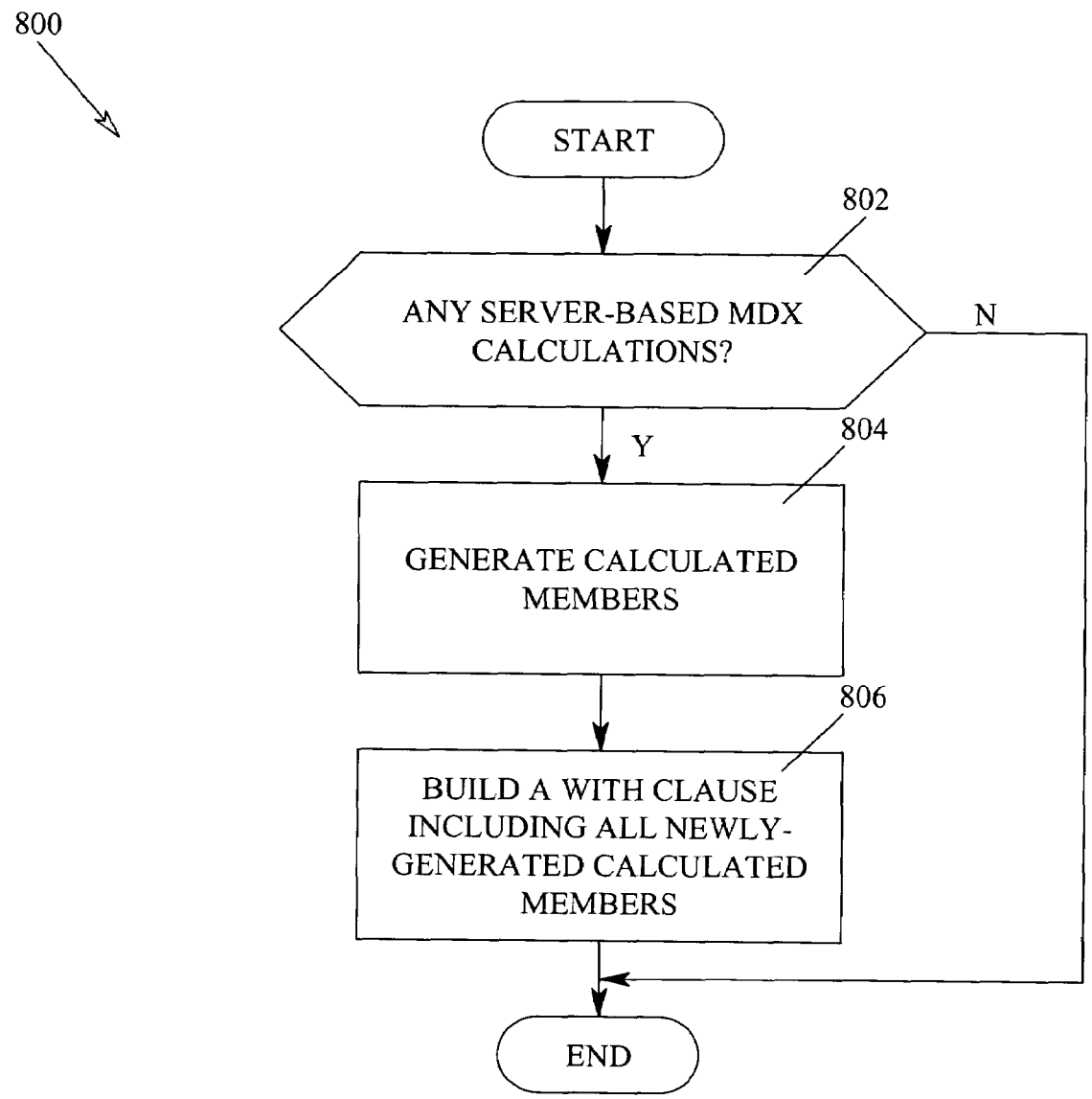
FIG. 8 is a flow chart of a method for generating a with clause (if any) which is performed by the method illustrated in FIG. 7.

Referring to FIG. 8, a method 800 for generating the With clause (i.e., at 702), if any, includes determining if there are any server-based MDX calculations (at 802). If not, method 800 ends. If so, the Calculated Members are generated (at 804). In one embodiment, the Calculated Members are generated by creating string representations of the calculation formula and syntax by reading each Dimension on each axis for Calculation objects. The Elements collection on the Calculation stores a representation of the formula. Then, at 806, a With clause is built that includes all of the newly-calculated members using the following structure:

With <calculated member name> As <calculation formula>

Figure 9:
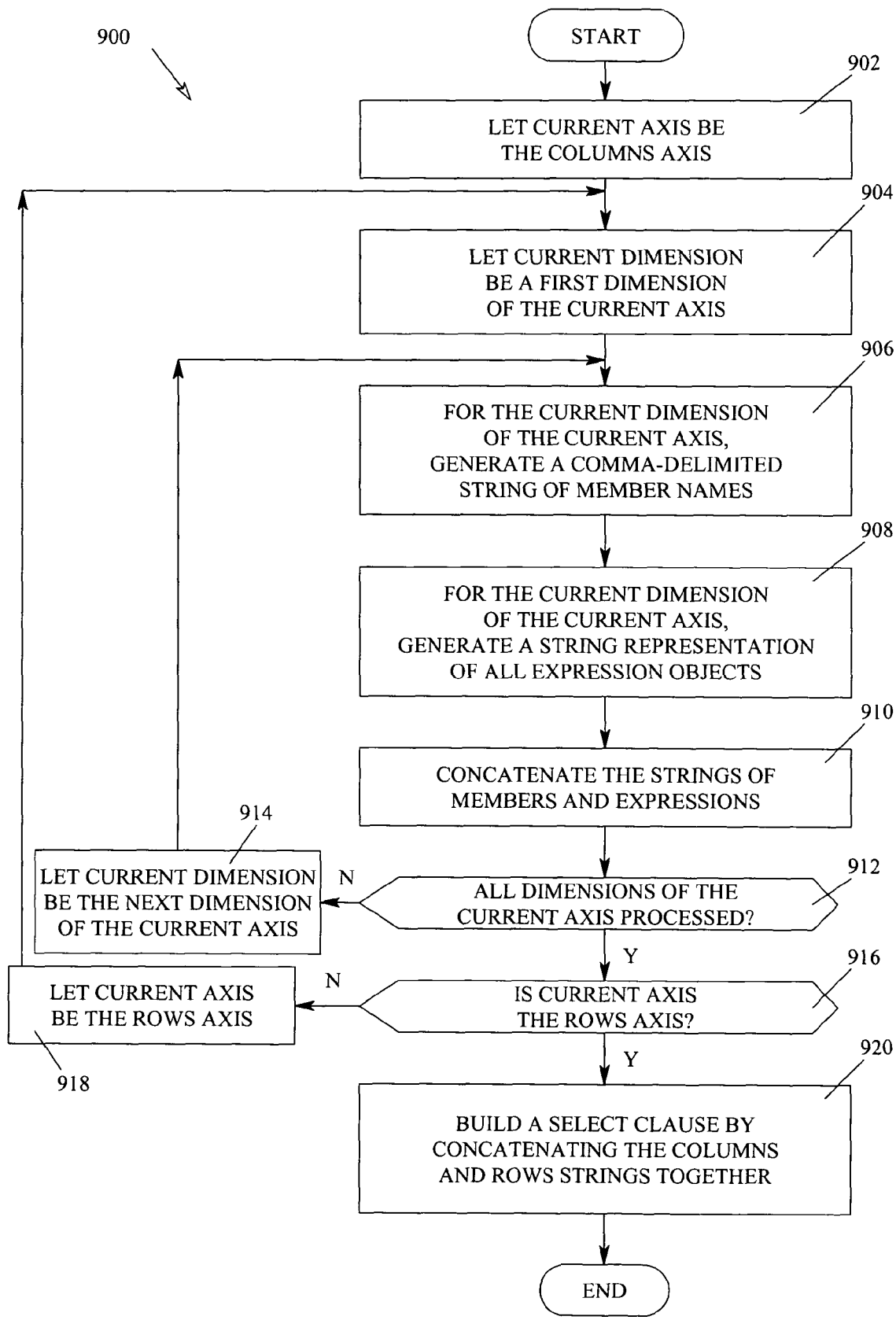
FIG. 9 is a flow chart of a method for generating a select clause which is performed by the method illustrated in FIG. 7.

Referring to FIG. 9, a method 900 for generating the Select clause (i.e., at 704) includes creating a string representation of the Members and Expressions for the Columns axis, and then for the Rows axis, and then concatenating the strings for the Columns and the Rows axes together. In particular, method 900 includes letting the current axis be the Columns axis (at 902) and letting the current dimension be a first dimension of the current axis (at 904). Then, at 906, for the current dimension of the current axis, a comma-delimited string of Member names is generated, using the Name property for each Member rather than the Caption property. Note that, if there are no Member objects in the Dimension's Members collection, then the MDX Default-Member syntax causes Microsoft Analysis Services to select the Member designated as the Default Member for the Dimension (e.g., [MyDimension].DefaultMember), as specified by the definition of the Dimension and Cube. Also, note that any Calculated Member definitions for the current Dimension are also included within this string of Members. At 908, again for the current dimension of the current axis, a string representation of all Expression objects for the Dimension is generated. Expressions are another way to select Members for a Dimension. An exemplary Expression is "Top 5 Members from the Sales Person Dimension", in which case the Arguments property on the Expression object will contain the value "5" and the Expression Type property will indicate that this is a TopCount expression. At 910, the strings of Members and Expressions are concatenated together. At 912 and 914, if all the dimensions of the current axis have not yet been processed, method 900 lets the current dimension be the next Dimension of the current axis and returns to 906 to create the concatenated string of Members and Expressions for the next Dimension of the current axis. The MDX Cross Join function is used to join the Member and Expression strings from each Dimension together. At 916 and 918, once the Member and Expression string for the current axis (i.e., the Columns axis) has been established, method 900 lets the current axis be the rows axis and returns to 904 to establish the Member and Expression string for the next axis (i.e., the Rows axis). Then, at 920, once the Member and Expression strings have been established for all of the axes, a Select clause is built by concatenating the Columns and Rows strings together as follows:

Select <column specification> on Columns, <row specification> on Rows

Figure 10:
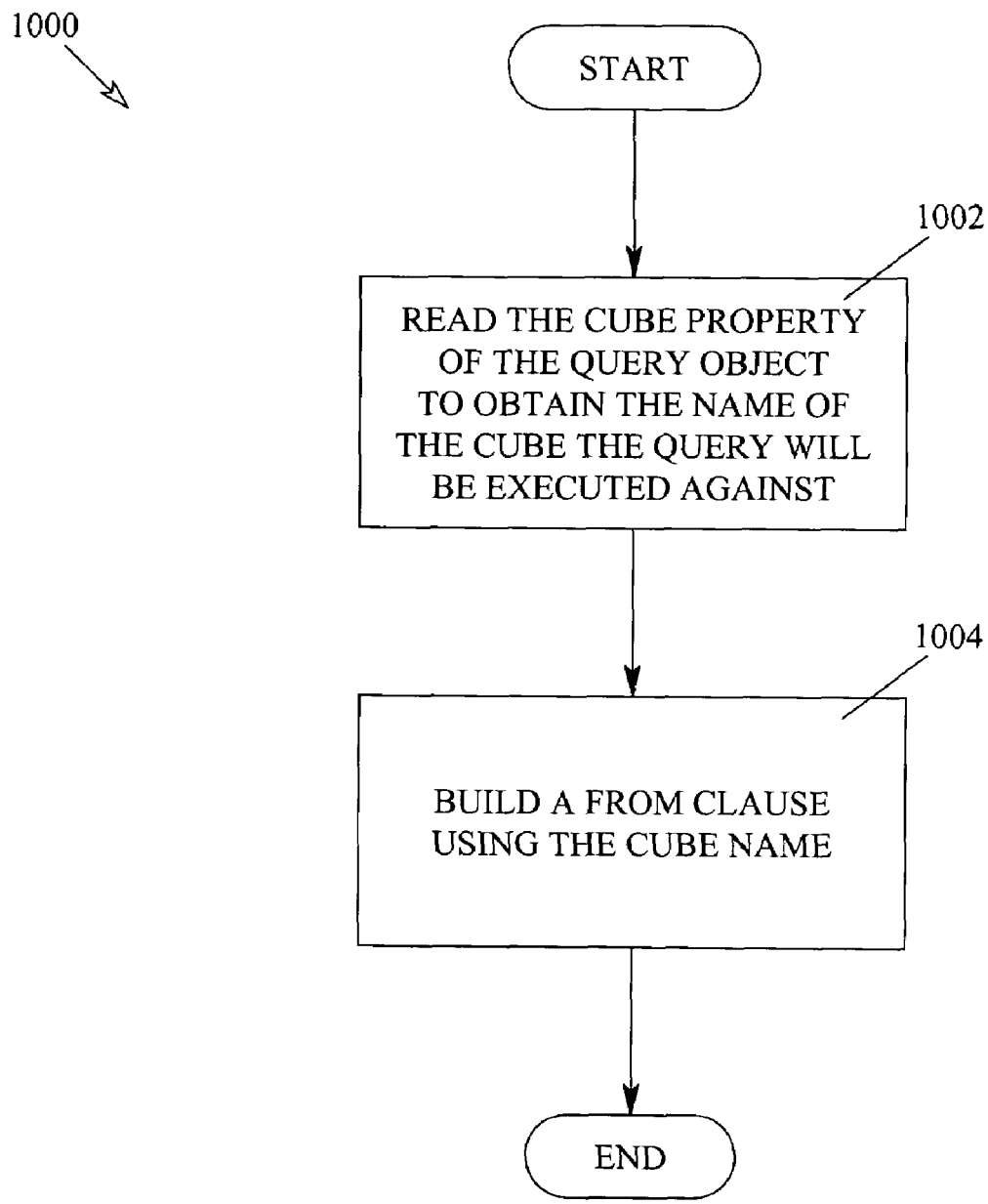
FIG. 10 is a flow chart of a method for generating a from clause which is performed by the method illustrated in FIG. 7.

Referring to FIG. 10, a method 1000 for generating the From clause (i.e., at 706) includes reading the Cube property of query object 502 to obtain the name of the OLAP cube the query will be executed against (at 1002). Then, at 1004, a From clause is built using the cube name as follows:

From <cube>

Figure 11:
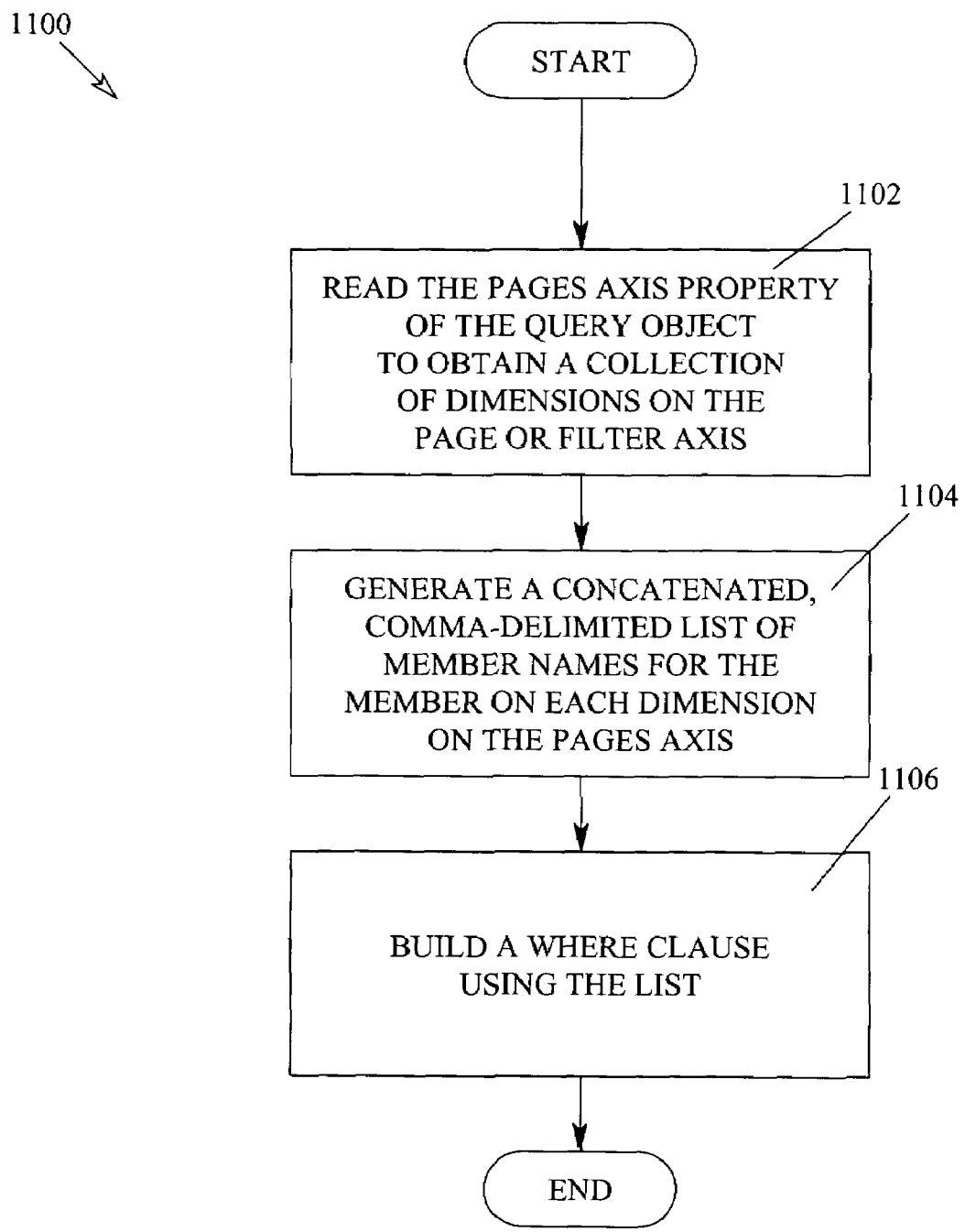
FIG. 11 is a flow chart of a method for generating a where clause (if any) which is performed by the method illustrated in FIG. 7.

Referring to FIG. 11, a method 1100 for generating the Where clause (i.e., at 708), if any, includes reading the Pages axis property of query object 502 to obtain a collection of Dimensions on the page or filter axis (at 1102). Then, at 1104, method 1100 includes generating a concatenated, comma-delimited list of Member names for the Member on each Dimension in the Pages axis. At 1106, a Where clause is built using the list that was generated at 1104 as follows:

Where <member specification>

Figure 12:
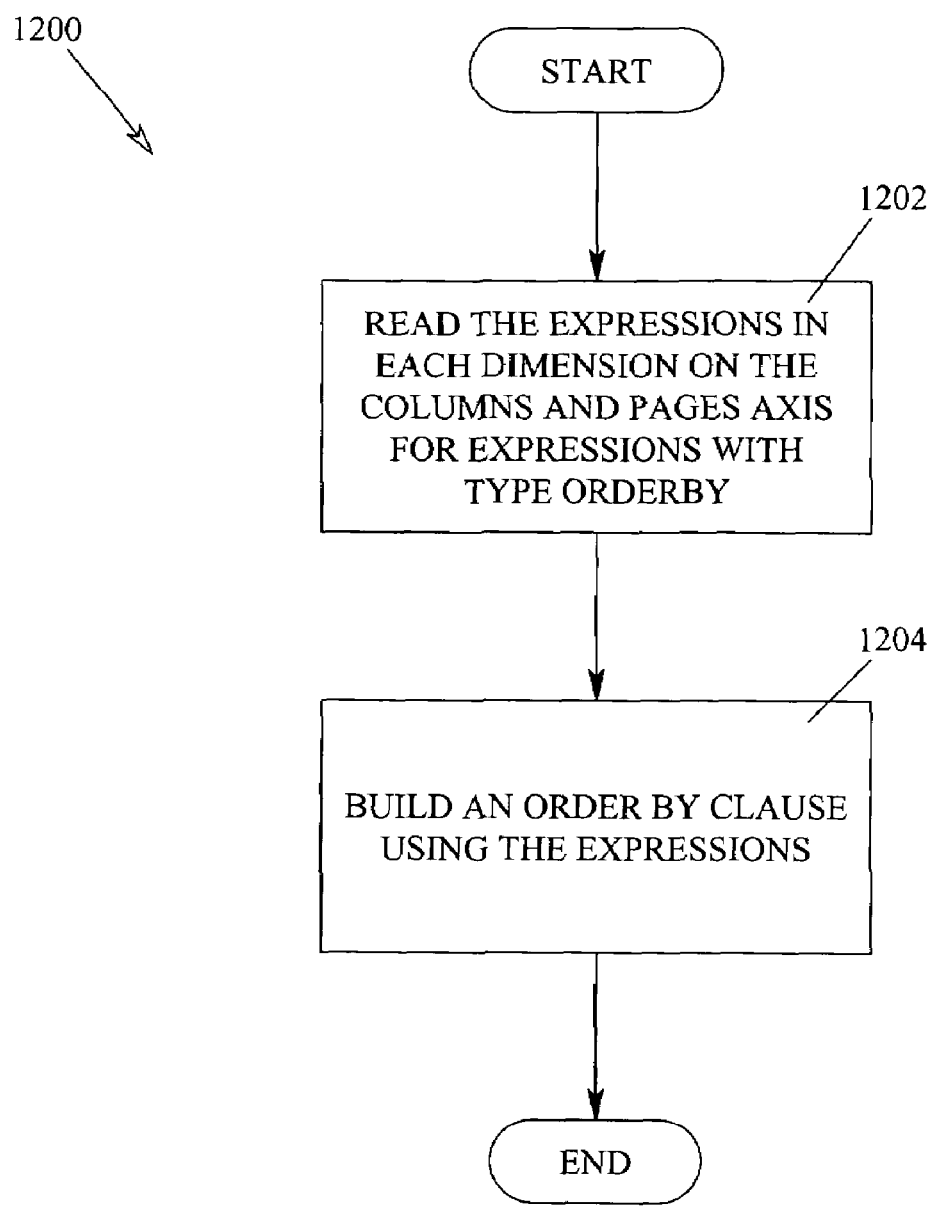
FIG. 12 is a flow chart of a method for generating an order by clause (if any) which is performed by the method illustrated in FIG. 7.

Referring to FIG. 12, a method 1200 for generating the Order By clause (i.e., at 710), if any, includes reading the Expressions in each Dimension on the Columns and Pages axis for Expressions with type OrderBy. Then, at 1204, an Order By clause is built using the Expressions with type OrderBy as follows:

OrderBy <member specification>

Thus, when the Provider property of query object 502 indicates that the Query will be executed against a Microsoft Analysis Services OLAP server, method 700 (FIG. 7) processes query object 502 to generate an MDX query statement. In particular, method 700 processes the Calculation objects of query object 502 first to generate the With clause, if any. Then, method 700 processes the Dimensions and Members in the Columns collection, and processes the Dimensions and Members in the Rows collection, to create the Select clause. Method 700 uses the Cube property on query object 502 to generate the From clause. Method 700 generates the Where clause according to the definition provided by the Dimensions and Members in the Pages Dimension, and generates the Order By clause by processing the Expressions collections attached to the Dimensions in the Rows and Columns collection. Method 700 then completes the MDX query statement by combining all of these clauses, and places the query statement in the Source property of query object 502.

Before discussing processing of the OLAP query object model to create an RS query, note several points about rules for Expression objects that are attached to Members versus Expression objects attached to Dimensions in the query object. A Member may have no more than one Expression object. Such an object indicates a relative reference to other members in the Dimension that are to be selected for the Result Set of the query, even though those members are not explicitly declared within the Members collection of the Dimension. Examples include Child Members of the current Member, or Descendant Members of the current Member. In contrast, Dimensions may have from zero to n Expression objects since they describe relative selections of Members for the Dimension, sorting criteria for the Members, etc. For MDX, a Dimension with a Member Selection expression (e.g., Top Count, Bottom Count) may not have any Members declared within its Member's collection. The Dimension may also have an Expression that indicates a sort order for the Members when the Result Set is returned. Therefore, for an MDX query format, there may be a Top Count Expression that selects the top n members in the Dimension based on some value. There may also be a Sort Order Expression which specifies that the top n members be sorted in a certain order within the Result Set. The Dimensions and Members on the Page axis may not have Expression objects. Note that the Type property of the Expression object indicates the effect that the Expression has on the Result Set (e.g., Top Count, Bottom Count, Sort, etc.).

Consider, for example, the following Dimension and Members:

Dimension: Time
Members:
All Time
  Quarter 1
    January
    February
    March
  Quarter 2
    April
    May
    June
  Quarter 3
    July
    August
    September
  Quarter 4
    October
    November
    December In this example, there are 17 Member objects for the Time Dimension (i.e., All Time, the four quarters, and the twelve months). January is a child of Member Quarter 1; Quarter 1 is the parent of Member January. All of the Members in the Dimension below the All Time Member are descendants of the All Time Member.

An Expression object attached to the Quarter 1 Member in the All Time Dimension of the query object may specify, for example, that the Result Set include the Quarter 1 Member and its children. A Time Dimension Expression may, for example, indicate that the Result Set show the Top 3 Members from this Dimension based on some numerical value. Yet another Time Dimension Expression may indicate that those Top 3 Members be sorted in ascending order in the Result Set.

In the case of an MDX query format, Members may be selected explicitly by specifying, for example, January and or February in the Query object. Alternatively, Members may be selected by using a Dimension Expression, such as the Top 3 Members. If the Time Dimension in the Query indicates an Expression that selects Members (such as the Top 3), then it is invalid to have any Members specified in the Members collection for the Dimension.

In the case of an RS query format, Dimension Expressions are applied to the Members that are selected explicitly for the Dimension. In this case, Members are explicitly selected for the Time Dimension, and a Member Expression can be used to indicate a relative reference on the current Member to other Members in the Dimension. For example, Descendant Members may be selected for the All Time Member. This selection can be further filtered through Dimension Expressions. For example, a Dimension Expression can be created that specifies the Top 3 Members for the Time Dimension. For the RS format, this indicates that the user wishes to select the Top 3 Members of the total Members selected for the Time Dimension. Therefore, in the example, the Result Set would return the Top 3 Descendants for the All Time Member.

Processing OLAP Query Object Model to Create an RS Query

Figure 13:
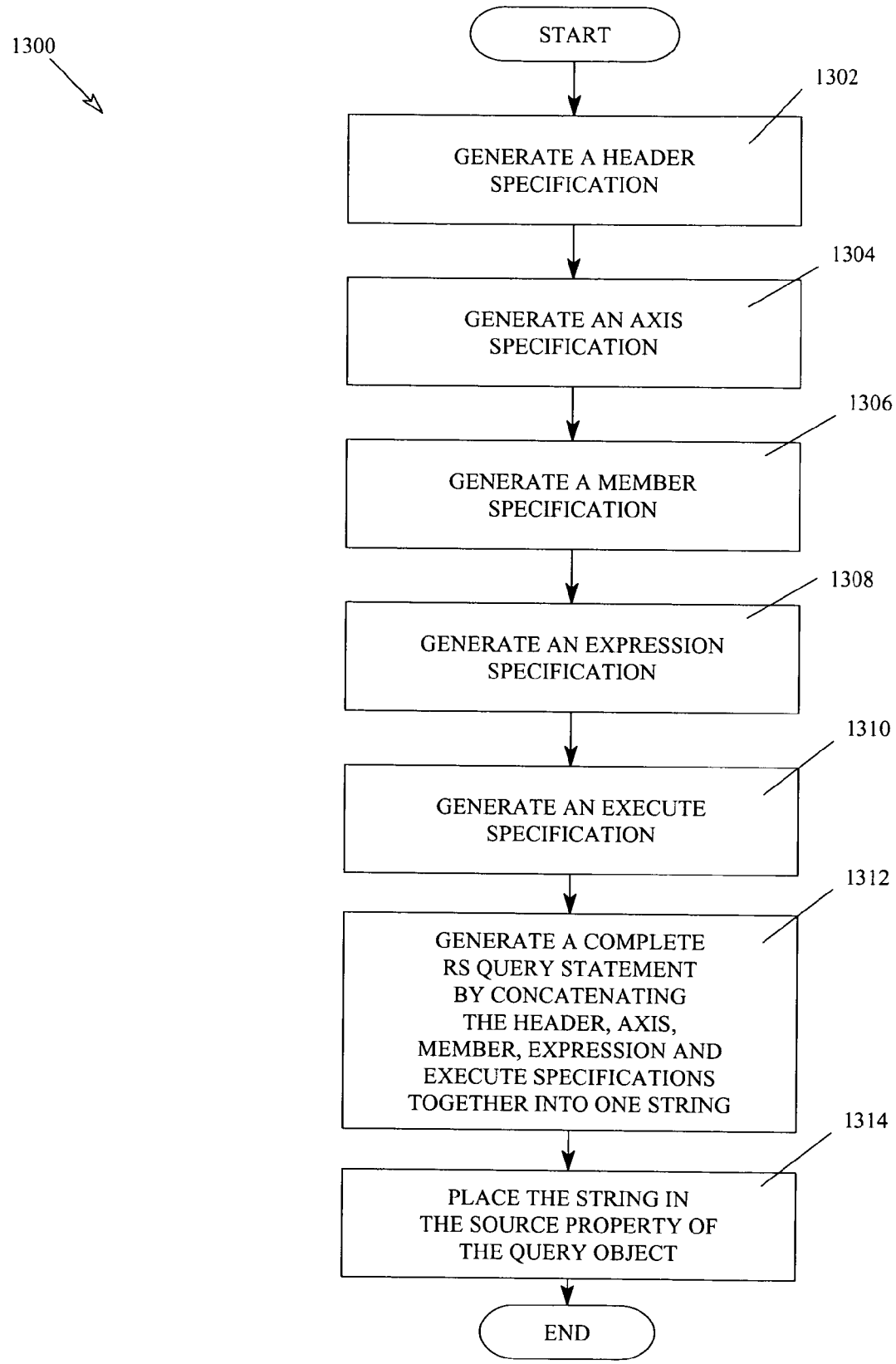
FIG. 13 is a flow chart of a method of processing the OLAP query object model of FIG. 5 to create an OLAP query statement using the RS syntax.

Referring to FIG. 13, a method 1300 is used for processing OLAP query object model 406 to create an OLAP query statement using the RS syntax (i.e., at 610). RS query statements are processed by first producing a list of Dimensions by axis (Page, Row, Column), followed by Members for each selected Dimension. Note that this model does not support Hyperion Essbase™ server-side calculations. Expressions are processed after Dimension members to complete the Query syntax.

Method 1300 starts the generation of RS query statements by generating their individual clauses or specifications. In particular, at 1302, 1304, 1306, 1308 and 1310, method 1300 generates a Header specification, an Axis specification, a Member specification, an Expression specification, and an Execute specification, respectively. Each of 1302, 1304, 1306, 1308 and 1310 is described in detail below. After generating the individual specifications of the RS statement, the complete RS query statement is generated (at 1312) from these specifications. In particular, the complete RS query statement is generated by concatenating the Header, Axis, Member, Expression and Execute specifications together into one string. Then, at 1314, this string is placed into the Source property of OLAP query object 502.

Figure 14:
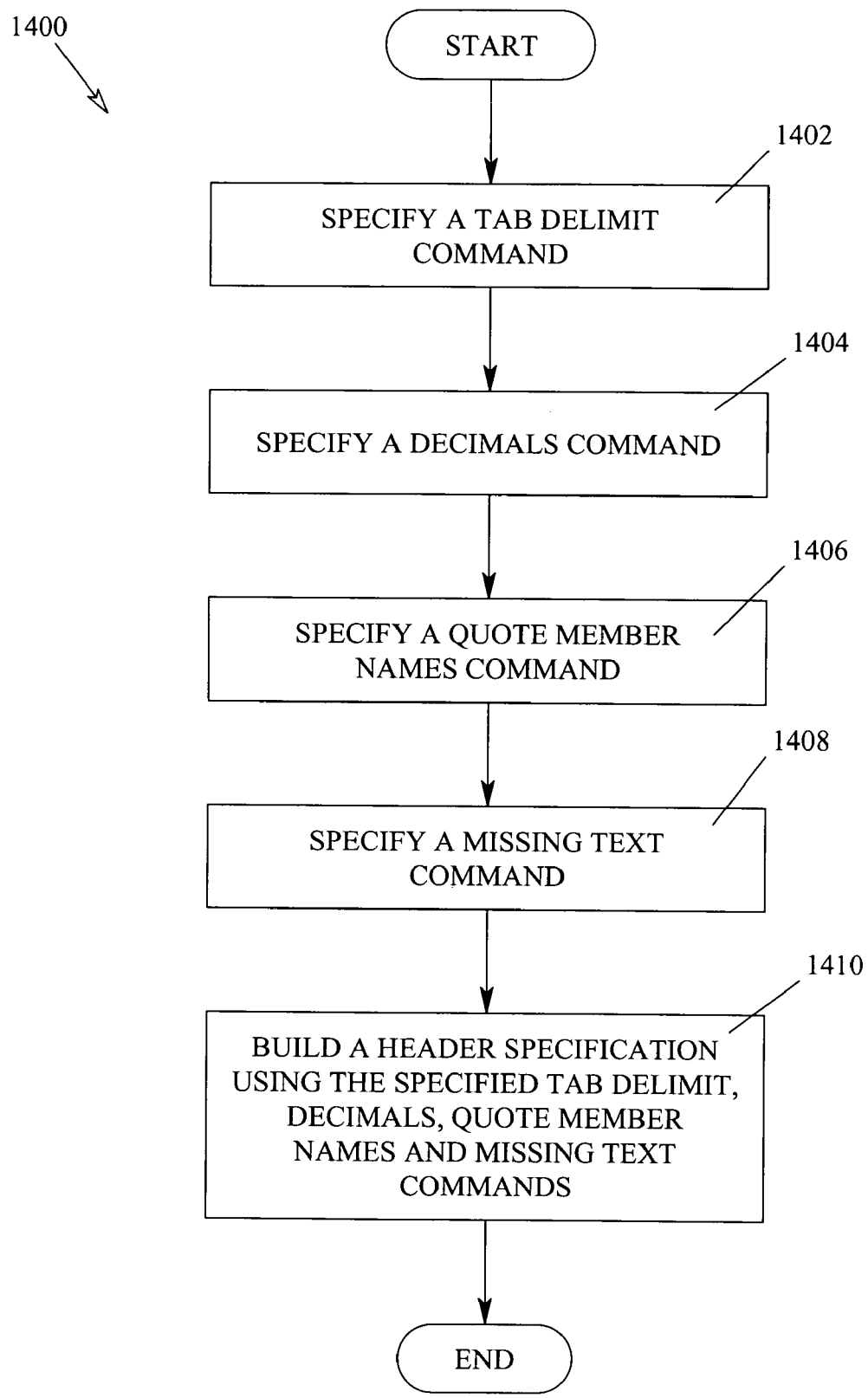
FIG. 14 is a flow chart of a method for generating a header specification which is performed by the method illustrated in FIG. 13.

Referring to FIG. 14, a method 1400 for generating the Header specification (i.e., at 1302) includes specifying a Tab Delimit command (at 1402), specifying a decimals command (at 1404), specifying a Quote Member Names command (at 1406), and specifying a Missing Text command (at 1408). Using these commands, which are defined by the Hyperion Essbase™ OLAP server, the Header will specify how to globally handle member names and delimiters within the result set returned by the Hyperion Essbase™ Application Programming Interface (API). At 1410, the Header specification is built using the specified commands in the following form:

{TABDELIMIT} {DECIMAL 10} <QUOTEMBRNAMES {OUTMBRNAMES} {MISSINGTEXT "0"}

Figure 15:
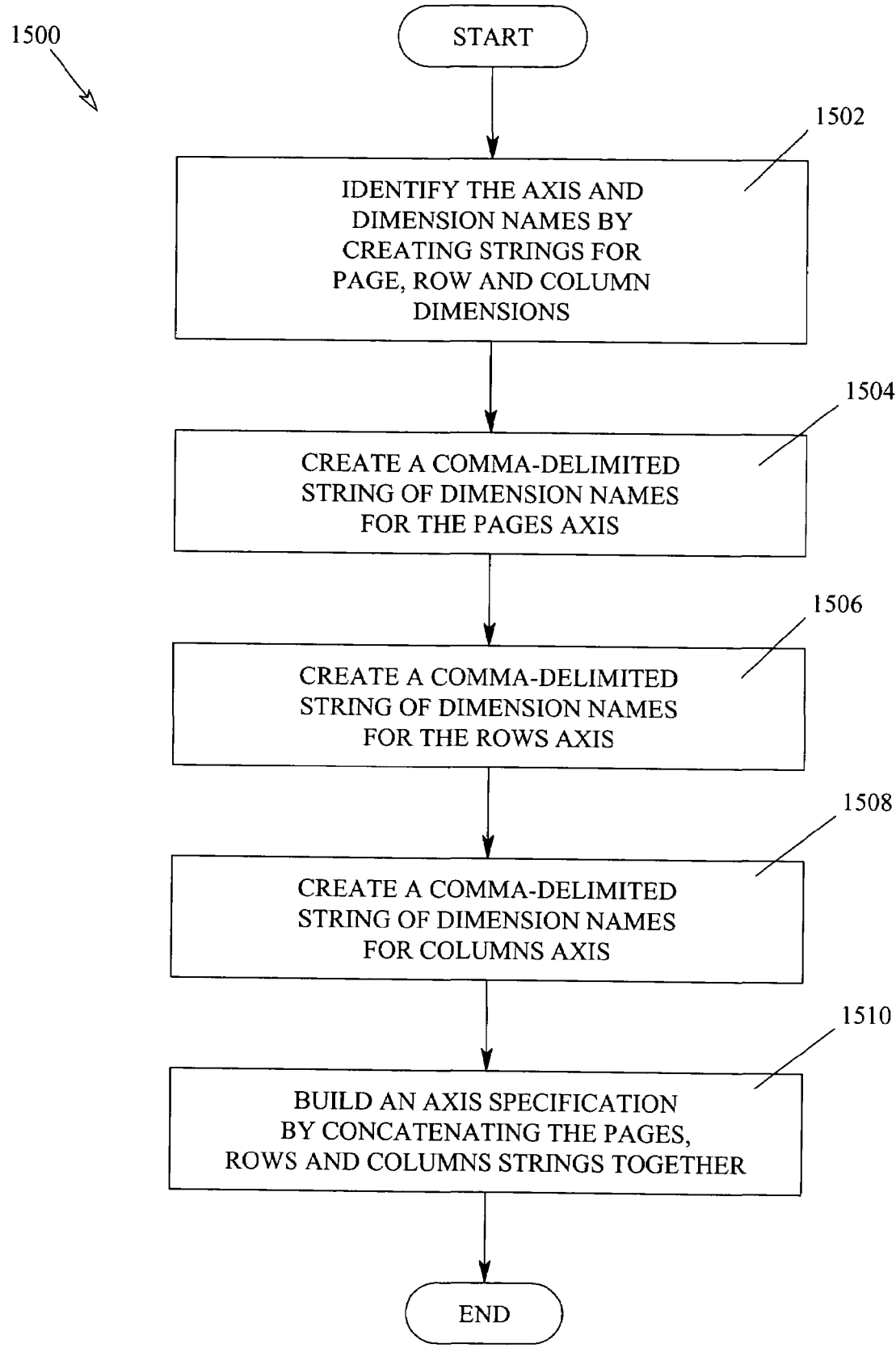
FIG. 15 is a flow chart of a method for generating an axis specification which is performed by the method illustrated in FIG. 13.

Referring to FIG. 15, a method 1500 for generating the Axis specification (i.e., at 1304) includes identifying the axis and Dimension names by creating strings for Page, Row and Column Dimensions (at 1502). Then, at 1504, 1506 and 1508, comma-delimited strings of Dimension Names for the Pages, Rows and Columns axes, respectively, are created. At 1510, an Axis specification is built by combining (e.g., concatenating) the Pages, Rows and Columns strings together into one string:

<PAGE("Fiscal Year")<ROW("Periods")<COLUMN ("Chart of Accounts")

Figure 16:
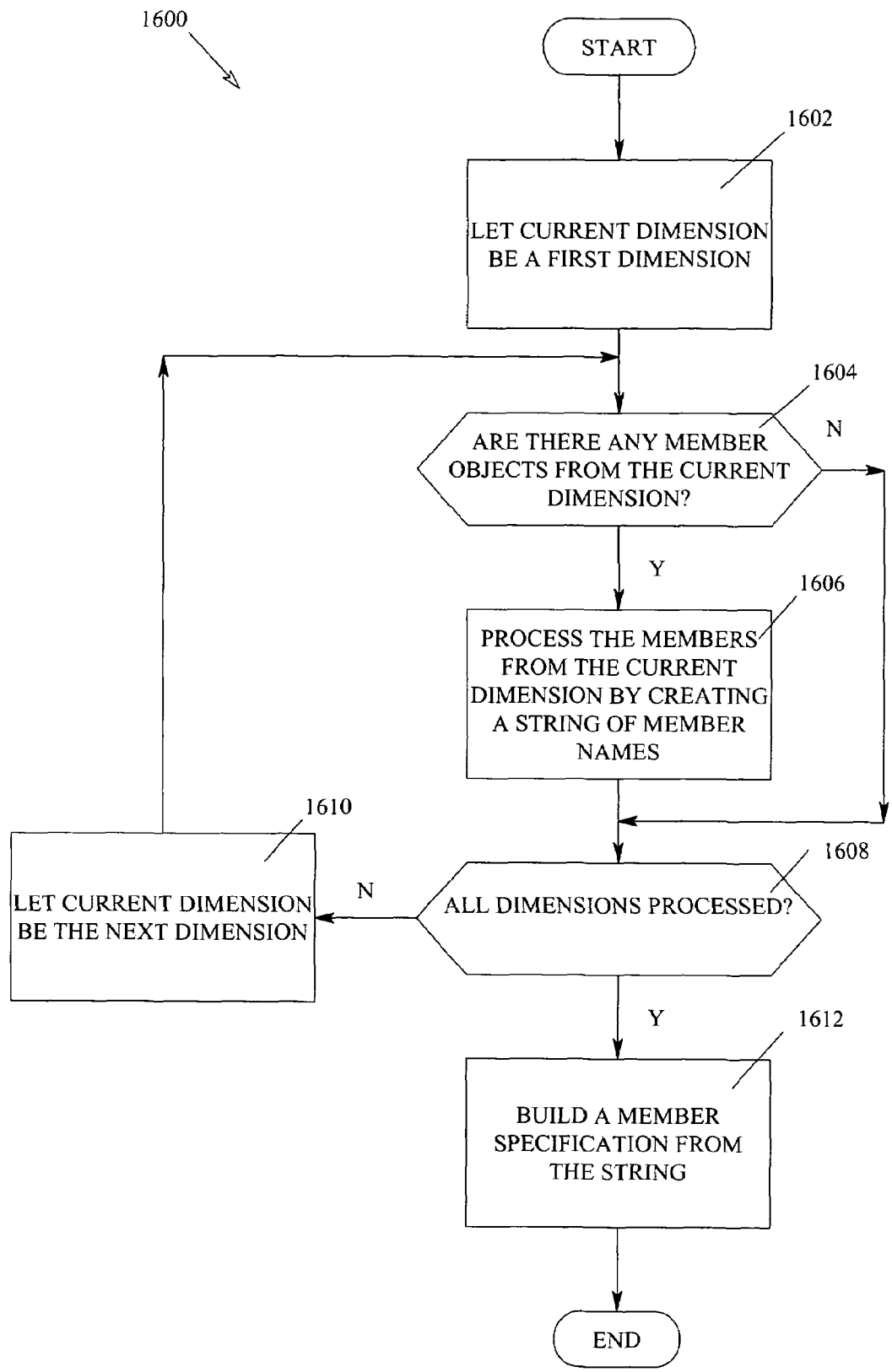
FIG. 16 is a flow chart of a method for generating a member specification which is performed by the method illustrated in FIG. 13.

Referring to FIG. 16, a method 1600 for generating the Member specification (i.e., at 1306) includes processing the Members from each Dimension by creating a string of Member names. In particular, at 1602, method 1600 lets the current dimension be a first dimension. At 1604, method 1600 checks if there are any Member objects for the current Dimension. If so, the Members from the current dimension are processed by creating the string of Member names (at 1606), with the Hyperion Essbase™ <Duplicate function preceding each Member name, and the Name property of the Member object being used instead of the Caption property to create the string. If, on the other hand, there are no Member objects for the current dimension, the current dimension is skipped without updating the string. Then, at 1608, method 1600 checks whether all of the dimensions have been processed. If not, at 1610, method 1600 lets the current dimension be the next dimension, and returns to 1604 to process the next dimension. Once all of the dimensions have been processed, a Member specification is built from the string (at 1612) as follows:

<DUPLICATE "p Qtr1" <DUPLICATE "p Qtr2"

Figure 17:
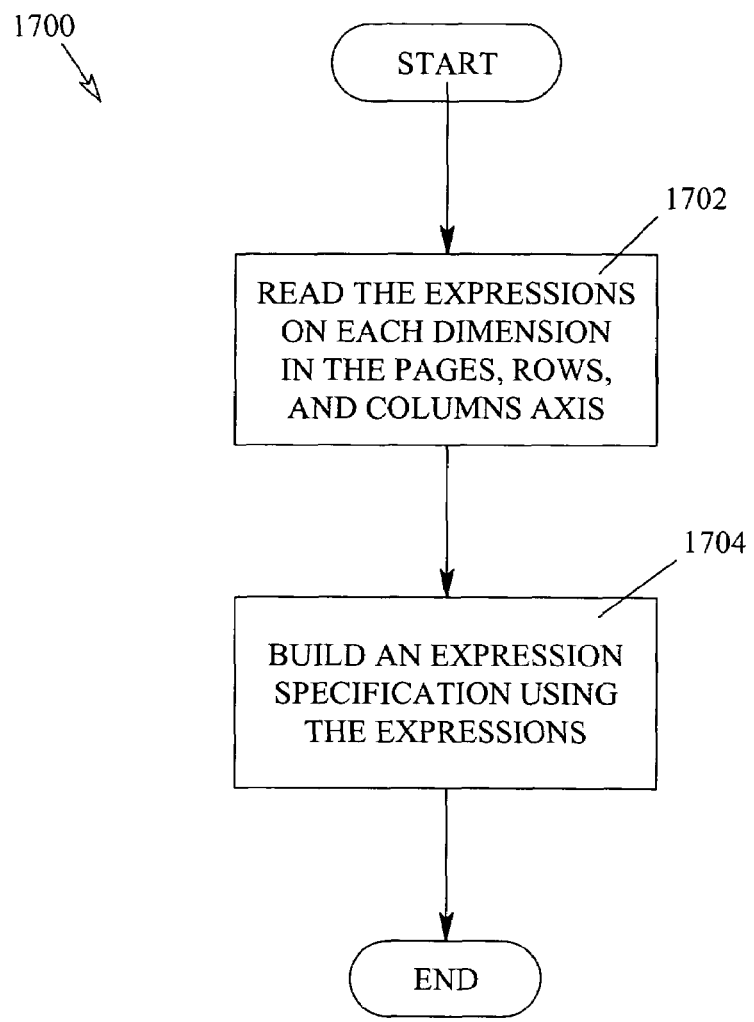
FIG. 17 is a flow chart of a method for generating an expression specification which is performed by the method illustrated in FIG. 13.

Referring to FIG. 17, a method 1700 for generating the Expression specification (i.e., at 1308) includes reading Expressions such as Top Count, Order By, etc. on each Dimension in the Pages, Rows and Columns axes (at 1702), and building an Expression specification using the Expressions that were read (at 1704).

Figure 18:
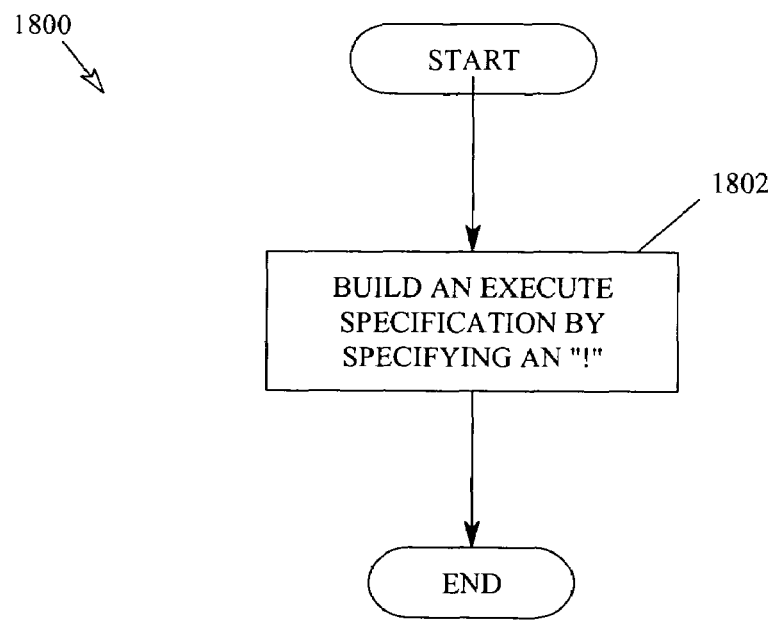
FIG. 18 is a flow chart of a method for generating an execute specification which is performed by the method illustrated in FIG. 13.

Referring to FIG. 18, a method 1800 for generating the Execute specification (i.e., at 1310) includes specifying an exclamation point (i.e., "!") to cause Hyperion Essbase™ to execute the RS query statement (at 1802).

Thus, when the Provider property of query object 502 indicates that the Query will be executed against an Hyperion Essbase™ OLAP server, method 1300 (FIG. 13) processes the OLAP query object 502 to generate an RS query statement. In particular, method 1300 processes the query object 502 to generate the Header, Axis, Member, Expression, and Execute specifications. Method 1300 completes the RS query statement by combining all of these specifications, and then places the complete RS query statement in the Source property of query object 502.

Before discussing the implementation of OLAP navigation functions, note several points about the rules for Expression objects that are attached to Members versus Expression objects attached to Dimensions in the query object. Expressions attached to Member objects have the same behavior as with the MDX query format, as described above. A Dimension still has zero to n Expression objects. However, the Expression objects that specify a selection of Members (e.g., Top Count, Bottom Count, etc.) are applied to the Members selected for the Dimension, not for all Members of the Dimension as defined by the Cube (as with MDX). Thus, when Expression objects are defined for Dimensions, it is proper to also have Members identified for the Dimension, and those Members may have an Expression object. Therefore, with RS, the Members of a Dimension may have Expression objects; however, they may have zero to one Expression objects. The Dimension may have zero to n Expression objects that either select Members, or specify a sort order. With MDX, if a Dimension has a Member Select Expression (e.g., Top Count), there may not be any Members declared in the query for that Dimension. Also, a Dimension may have more than one Member Selection expression (e.g., there may be both Top Count and Bottom Count Expression objects for the Dimension). Note that the Type property of the Expression object indicates the effect the Expression has on the Result Set (e.g., Top Count, Bottom Count, Sort, etc.).

Implementing OLAP Navigation Functions

OLAP query and reporting applications such as applications 402 (FIG. 4) typically support basic techniques for navigating OLAP data cubes such as cubes 324 and 332

Figure 19:
FIG. 19 is a chart listing basic functions for navigating OLAP cube data.

(FIG. 3). These navigation functions, which include Drill, Pivot, Keep Only and Remove Only functions, are listed and described by table 1900 in FIG. 19.

Once the Query generation steps are implemented for generating MDX and RS query statements as described above, processing the Drill, Pivot, Keep Only and Remove Only navigation functions is performed as described by table 2000 in FIG. 20. Similar processing may be used when other OLAP structured query formats are specified.

Impact on the Result Set

Figure 21:
FIG. 21 is a chart representing the order of dimensions and members for an exemplary query statement generated using either the MDX or RS syntax.
Figure 22:
FIG. 22 is a chart representing a first result set that would be produced by processing a query as in FIG. 21 on an exemplary OLAP cube, displayed as a grid.

In the case of both MDX and RS, the order of dimensions and members in the query statement directly translates to the order in which they appear in the result set. For example, consider the order of dimensions and members for an exemplary query statement generated using either MDX or RS shown by chart 2100 in FIG. 21. This example includes one column dimension (i.e., "Fiscal Years") and two row dimensions (i.e., "Accounts", "Time"). Processing this query on an exemplary cube produces a result set that, when displayed in a grid, appears as grid 2200 in FIG. 22.

Figure 23:
FIG. 23 is a chart representing the revised order of dimensions and members produced by pivoting the accounts dimension to the end of the dimensions in the rows collection (the accounts dimension is now the last dimension on the rows axis)
Figure 24:
FIG. 24 is a chart representing a second result set that would be produced by processing a query as in FIG. 23 on an exemplary OLAP cube, displayed as a grid.

By pivoting the Accounts Dimension to the end of the Dimensions in the Rows collection (so the Accounts Dimension is now the last dimension on the Rows axis), causes the order of the dimensions and members to appear as shown by chart 2300 in FIG. 23. Note that there is still one column dimension (i.e., "Fiscal Years") and two rows dimensions (i.e., "Time", "Accounts"), but the rows dimensions have been reversed. Processing this query on the exemplary cube produces a second result set that, when displayed in a grid, appears as grid 2400 as shown in FIG. 24.

Figure 25:
FIG. 25 is a chart representing the revised order of dimensions and members produced by pivoting the accounts dimension to the columns dimension (with the accounts dimension being added as the last dimension on the columns collection)
Figure 26:
FIG. 26 is a chart representing a third result set that would be produced by processing a query as in FIG. 25 on an exemplary OLAP cube, displayed as a grid.

Now, by pivoting the Accounts Dimension to the columns collection (and using the default of adding the Accounts Dimension as the last Dimension in the columns collection), the output shown by chart 2500 in FIG. 25 is produced. Note that there are now two column dimensions (i.e., "Fiscal Years", "Accounts") and only one row dimension (i.e., "Time"). The result set, when displayed as a grid, now appears as grid 2600 as shown in FIG. 26. Note that the result set operates as a matrix of members and cells that is always symmetrical, and that the Members of the Accounts Dimension are repeated for Fiscal Years 1999 and 2000.

Custom Properties

Figure 27:
FIG. 27 is a chart representing the third result set of FIG. 26, with a property object added to the revenue member's properties collection to format the revenues in bold print, and with a refresh method being called to cause this property (bold print) to be spread to the affected cells and members of the result set, displayed as a grid.

To implement custom member formatting, a custom property may be added to a Member's Properties collection, and implemented by an application that reads the result set and displays the data in grid form. For example, if an end user wishes to format Revenues in bold print, the end user would add a Property object to the Revenue Member's Properties collection, and call the Refresh method on the Query object. The Refresh method implements a process that causes this property (i.e., bold print) to be spread to the affected cells and members of the result set. The application then re-displays the grid, which would appear as grid 2700 as in FIG. 27. Both Revenue columns appear in bold. This occurs because, even though the Query object includes only one Revenue Member object, the nature of the Dimensions on the Columns axis causes two Revenue columns to exist in the result set.

Summary

Thus, a method and apparatus for generating OLAP queries which can be used by OLAP query and reporting applications to efficiently and easily support multiple OLAP database servers that use different structured query formats has been described. The method and apparatus can be used, for example, by OLAP query and reporting applications that support both Microsoft Analysis Services and Hyperion Essbase™ database servers from a common code base. The described method and apparatus can also be easily adapted to generate OLAP queries using other structured query formats that are used by other OLAP servers on the market today, or by future OLAP servers.

It is to be understood that the above description is intended to be illustrative, and not restrictive. Many other embodiments will be apparent to those of ordinary skill in the art upon reviewing the above description. The scope of the present invention should, therefore, be determined with reference to the appended claims, along with the full scope of equivalents to which such claims are entitled.

Appendix A: Query Object

Query object 502 is the root of the overall query definition object model. A Query is an abstract definition of an OLAP query.

| | Use |
|---|---|
| Property | |
| Result Set | (Object Model) The result set object model. |
| Columns | (Object Collection) Collection of column Dimensions. |
| CreatedBy | (String) Name of the user who created the Query. |
| Cube | (String) Name of the OLAP cube that the Query is to be executed against. |
| Description | (String) Description of the object. |
| IncludeMissing | (Boolean) indicates whether missing cells should be included in the query result set with a null value returned. |
| IncludeNoAccess | (Boolean) Indicates whether cells the user does not have access to per the OLAP Server's security are included in the query result set with a null value returned. |
| Name | (String) Name of the object. |
| Pages | (Object Collection) Collection of page Dimensions. |
| PassThrough | (Boolean) Indicates if the Source property is set, or overridden by the calling application. |
| Properties | (Object Collection) Collection of Property objects that allow for custom Query object properties. |
| Provider | (String) Indicates whether the OLAP server is an Hyperion Essbase ™ OLAP server or a Microsoft Analysis Services OLAP server. |
| ReadOnly | (Boolean) Indicates whether OLAP Navigation Functions can occur on the Query. |
| Rows | (Object Collection) Collection of Row Dimensions. |
| Source | (String) The MDX or RS source generated by the processing of the object model. |
| LevelDrill | (Boolean) indicates whether drill methods should process drills a level at a time by removing the sibling members for the member drilled upon, or by leaving siblings of the member drilled upon. |
| Method | |
| Drill | Method to drill down, or up on members belonging to a Dimension object. |
| Execute | Executes the Query against the OLAP server and database. |
| KeepOnly | Keeps only the selected Member(s) for the Dimension to which they belong. |

-continued

| | Use |
|---|---|
| Pivot | Moves a Dimension from one axis to another, or changes the order of Dimensions on the same axis. |
| Refresh | Perfonns calculations and refreshes Member object custom properties (formatting, conditional formatting, etc) on the Result Set. |
| Remove Only | Removes only the selected Member(s) from the Dimension to which they belong. |
| Save | Saves the Query. |

Appendix B: Dimension Object

Dimension object 508 includes collections of Member, Expression, and Calculation objects.

| Property | Use |
|---|---|
| Calculations | (Collection) Group of Calculation objects for this Dimension. |
| Count | (Integer, read only) Number of Member objects in the Dimension's Members collection. |
| Members | (Object Collection) Member objects that have been explicitly selected for the current Dimension. |
| Name | (String) Name of the Dimension object. |
| Type | (Integer) Type of dimension (Page List or Page Tree). |
| Expressions | (Collection) Group of Expression objects for this Dimension. |
| Properties | (Collection) Group of property objects that allow for custom Query object properties. |

Appendix C: Member Object

Member object 512 is an OLAP database member element.

| Property | Use |
|---|---|
| Caption | (String) The user-friendly name for the Member. |
| Dimension | (String) Name of the Dimension to which the Member belongs. |
| Expressions | (Collection) Group of Expression objects for this Member. |
| MemberType | (Integer) Indicates whether the Member is a calculated Member. |
| Name | (String) The OLAP server name, or Key for the Member. |
| Properties | (Collection) Group of property objects that allow for custom Query object properties. |
| Selected | (Boolean) Indicates whether the member is currently selected in the case of a Member belonging to a Page Dimension. |

Appendix D: Calculation Object

Calculation object 516 provides a definition of a calculated Member and a related formula.

| Property | Use |
|---|---|
| Elements | (Collection) Group of Element objects for the current Calculation. |
| Name | (String) name of the Calculation. Note, this must correspond to a Member object within the Dimension. |
| ParentDimension | (String) name of the Dimension to which the calculation belongs. This is useful in simplifying the generation of MDX server-based calculations. |
| ParentMemberName | (String) name of the Member that is the parent of the calculated member. |
| Type | (Integer) Indicates whether the Calculation is server-based or local. |

Appendix E: Element Object

Element object 520 is an individual Calculation operand or operator. Calculation Elements are literals, other members, and mathematical operators.

| | Use |
|---|---|
| Property | |
| Count | (Integer, read only) Number of member objects in the Members collection for the Element. Note, only used if the Type indicates the element is one or more Members. |
| Item | (Member) Instance of a Member object. |
| Ordinal | (Integer) specifies the processing order of the Element within the Calculation. |
| Type | (Integer) Indicates whether the Element is a Member Name, Member Set, Operator (<, >, /, +, *), or literal (example: 100). |
| Value | (Variant) Value of the Literal if the Element Type specifies it as a Literal. |
| Method | |
| Add | Adds a member to the Element's Members collection. |
| Remove | Removes a Member from the Element's Members collection. |

Appendix F: Expression Object

Expression object 524 defines an advanced Member selection, or special member selection process (such as Top N, Bottom N, etc.).

| | Use |
|---|---|
| Property | |
| Arguments | (Array) Group of Argument strings that define the behavior of the expression. |
| ArgumentString | (String, read only) Provides a comma-delimited string representing the Arguments collection. |

-continued

| | Use |
|---|---|
| Count | (Integer, read only) The total number of Arguments in the Arguments array property. |
| Type | (Integer) Specifies the type of Expression (such as Top Count, Bottom Count, Top Percent, etc.). |
| Method | |
| Remove | Removes an argument from the Arguments array. |

Appendix G: Argument Object

Argument object 528 provides the value for the argument.

| Property | Use |
|---|---|
| Value | (String) Contains the value for the argument. |

Appendix H: Property Object

Property object 534 provides collection of objects for implementation of custom Query or Member properties.

| Property | Use |
|---|---|
| Attributes | (Variant) Used for custom indicators or keys for the Property object. |
| Name | (String) Name of the Property object. |
| Type | (Integer) Type of property object (for example, an integer that indicates Font Bold). |
| Value | (Variant) Numeric or String value of the Property object. |

What is claimed is:

1. An OLAP query generation engine executing in a computer for use in generating OLAP queries for one or more of a plurality of different OLAP servers, comprising:
   a query object model, the query object model including a data structure which models an OLAP query in an abstract form, wherein the abstract form is compatible with two or more different OLAP structured query formats, wherein each OLAP structured query format is associated with one of the plurality of OLAP servers; and
   a programming interface for generating an OLAP query statement in one of the associated OLAP structured query formats from the query object model, wherein the OLAP structured query format to be used is specified by the associated query object model.

2. The engine of claim 1, wherein the data structure models the OLAP query in a form different from the implementation of underlying OLAP servers.

3. The engine of claim 1, wherein the programming interface is also for maintaining the OLAP query statement.

4. The engine of claim 1, wherein the programming interface is also for executing the OLAP query statement.

5. The engine of claim 1, wherein the query object model is capable of specifying the MDX and the RS query formats, and the programming interface generates an MDX query statement and an RS query statement when the query object model specifies the MDX query format and the RS query format, respectively.

6. The engine of claim 1, wherein the query object model is capable of specifying first, second and third structured query formats, and the programming interface generates the query statement using the first, second and third formats when the query object model specifies the first, second and third structured query formats, respectively.

7. An OLAP query object model for use in generating an OLAP query statement for one or more of a plurality of different OLAP servers, comprising:
   a query object which defines an OLAP query in an abstract form, wherein the abstract form is compatible with two or more different OLAP structured query formats, wherein each OLAP structured query format is associated with one of the plurality of OLAP servers; and
   a root object including methods, executing in a computer, for transforming the query object into an OLAP query statement in one of the associated OLAP structured query formats, wherein the OLAP structured query format to be used is specified by the query object.

8. The model of claim 7, wherein the query object is capable of specifying the MDX query format and the RS query format, and the root object includes methods for generating an MDX query statement and an RS query statement when the query object specifies the MDX query format and the RS query format, respectively.

9. The model of claim 7, wherein the query object is capable of specifying first, second and third structured query formats, and the root object includes methods for generating the query statement using the first, second and third structured query formats when the query object specifies the first, second and third structured query formats, respectively.

10. An OLAP query generation engine, executing in a computer, for use with an OLAP query and reporting application that supports a first OLAP server using a first structured query format and supports a second OLAP server using a second structured query format, wherein the first and second structured query formats are different, the engine comprising:
    an object model including a data structure that models an OLAP query in an abstract form, wherein the abstract form is compatible with both of the two different OLAP structured query formats; and
    a programming interface operating on a computer for generating an OLAP query statement according to the first structured query format when the first structured query format is specified by the object model and according to the second structured query format when the second structured query format is specified by the object model.

11. The engine of claim 10, wherein the object model supports a Microsoft Analysis Services OLAP server using the MDX query format and an Hyperion OLAP server using the RS query format, and the programming interface generates an MDX query statement and an RS query statement when the object model specifies the MDX query format and the RS query format, respectively.

12. A computer-implemented method of generating an OLAP query, the method comprising:
    providing a query object, the query object including a data structure which models an OLAP query in an abstract form, wherein the abstract form is compatible with two or more different OLAP structured query formats, wherein each different OLAP structured query format is associated with a different type of OLAP server;

selecting, based upon a property of the query object, an OLAP server associated with one of the two or more different OLAP structured query formats; and processing the query object in a computer to generate a query statement using the structured query format corresponding to the OLAP server selected.

13. The method of claim 12, wherein the query object supports the Microsoft Analysis Services OLAP server and the Hyperion OLAP server, and the processing generates an MDX query statement and an RS query statement when the property indicates that the OLAP server is a Microsoft Analysis Services OLAP server and a Hyperion OLAP server, respectively.

* * * * *

UNITED STATES PATENT AND TRADEMARK OFFICE
CERTIFICATE OF CORRECTION

PATENT NO. : 7,363,287 B2  Page 1 of 1
APPLICATION NO. : 10/645708
DATED : April 22, 2008
INVENTOR(S) : Kilmer et al.

It is certified that error appears in the above-identified patent and that said Letters Patent is hereby corrected as shown below:

In column 9, line 44, delete "select,from," and insert -- select, from, --, therefor.

In column 12, line 7, delete "<members>on" and insert -- <members> on --, therefor.

In column 19, line 10, delete "Perfonns" and insert -- Performs --, therefor.

Signed and Sealed this

Twelfth Day of August, 2008

JON W. DUDAS
*Director of the United States Patent and Trademark Office*